(12) United States Patent
Malmberg

(10) Patent No.: US 10,683,635 B2
(45) Date of Patent: Jun. 16, 2020

(54) HYDRAULIC MOTOR DRIVE ASSEMBLY AND SYSTEM AND METHOD OF USE THEREOF

(71) Applicant: Advanced Rail Concepts, Snohomish, WA (US)

(72) Inventor: Wendell A. Malmberg, Snohomish, WA (US)

(73) Assignee: ADVANCED RAIL CONCEPTS, Snohomish, WA (US)

( * ) Notice: Subject to any disclaimer, the term of this patent is extended or adjusted under 35 U.S.C. 154(b) by 132 days.

(21) Appl. No.: 15/983,903

(22) Filed: May 18, 2018

(65) Prior Publication Data

US 2019/0017244 A1    Jan. 17, 2019

Related U.S. Application Data

(60) Provisional application No. 62/508,592, filed on May 19, 2017.

(51) Int. Cl.
| | |
|---|---|
| *B60K 17/10* | (2006.01) |
| *B61D 15/00* | (2006.01) |
| *B62D 55/04* | (2006.01) |
| *E02F 9/02* | (2006.01) |
| *B61K 5/02* | (2006.01) |
| *F16H 47/04* | (2006.01) |
| *B61C 9/00* | (2006.01) |

(52) U.S. Cl.
CPC .............. *E02F 9/022* (2013.01); *B60K 17/10* (2013.01); *B61D 15/00* (2013.01); *B61K 5/02* (2013.01); *B62D 55/04* (2013.01); *F16H 47/04* (2013.01); *B60Y 2200/412* (2013.01); *B61C 9/00* (2013.01)

(58) Field of Classification Search
CPC ......... E02F 9/022; B60K 17/10; B61D 15/00; B61K 5/02; B62D 55/04; F16H 47/04; B60Y 2200/412; B61C 9/00
See application file for complete search history.

(56) References Cited

U.S. PATENT DOCUMENTS

| | | | | |
|---|---|---|---|---|
| 5,596,823 | A * | 1/1997 | Clasen | ...................... E01H 5/06 37/232 |
| 2003/0172837 | A1* | 9/2003 | Whiston | ................. B60F 1/043 105/215.2 |
| 2007/0235233 | A1* | 10/2007 | Caldwell | ................ B60K 17/10 180/6.48 |

(Continued)

*Primary Examiner* — Bryan A Evans
(74) *Attorney, Agent, or Firm* — Arent Fox LLP

(57) ABSTRACT

A motor drive assembly for selective rail or track operation of an excavators or other mobile platform via a source of hydraulic pressure. The motor drive assembly may include one or more drive arm assemblies mounted at ends of the mobile platform underbody, with the drive arm assembly including a motor, a gearbox, and hydraulic features for operation, including a counterbalance valve assembly, as well as improved gearbox and coupler elements operable therewith. The counterbalance valve assembly may include a cross-port relief valve and may have a first hydraulic operating circuit and a second hydraulic operating circuit. The first hydraulic operating circuit may communicate hydraulic pressure to the gearbox to enable movement of the mobile platform, and the second hydraulic operating circuit may prevent undesired communication of hydraulic pressure to the gearbox.

17 Claims, 33 Drawing Sheets

(56) References Cited

U.S. PATENT DOCUMENTS

| | | | | |
|---|---|---|---|---|
| 2007/0280811 A1* | 12/2007 | Caughern | ............... | E01B 29/06 |
| | | | | 414/723 |
| 2013/0087067 A1* | 4/2013 | Bodell | ................... | B60F 1/043 |
| | | | | 105/215.2 |
| 2019/0017244 A1* | 1/2019 | Malmberg | ............... | B61K 5/02 |

* cited by examiner

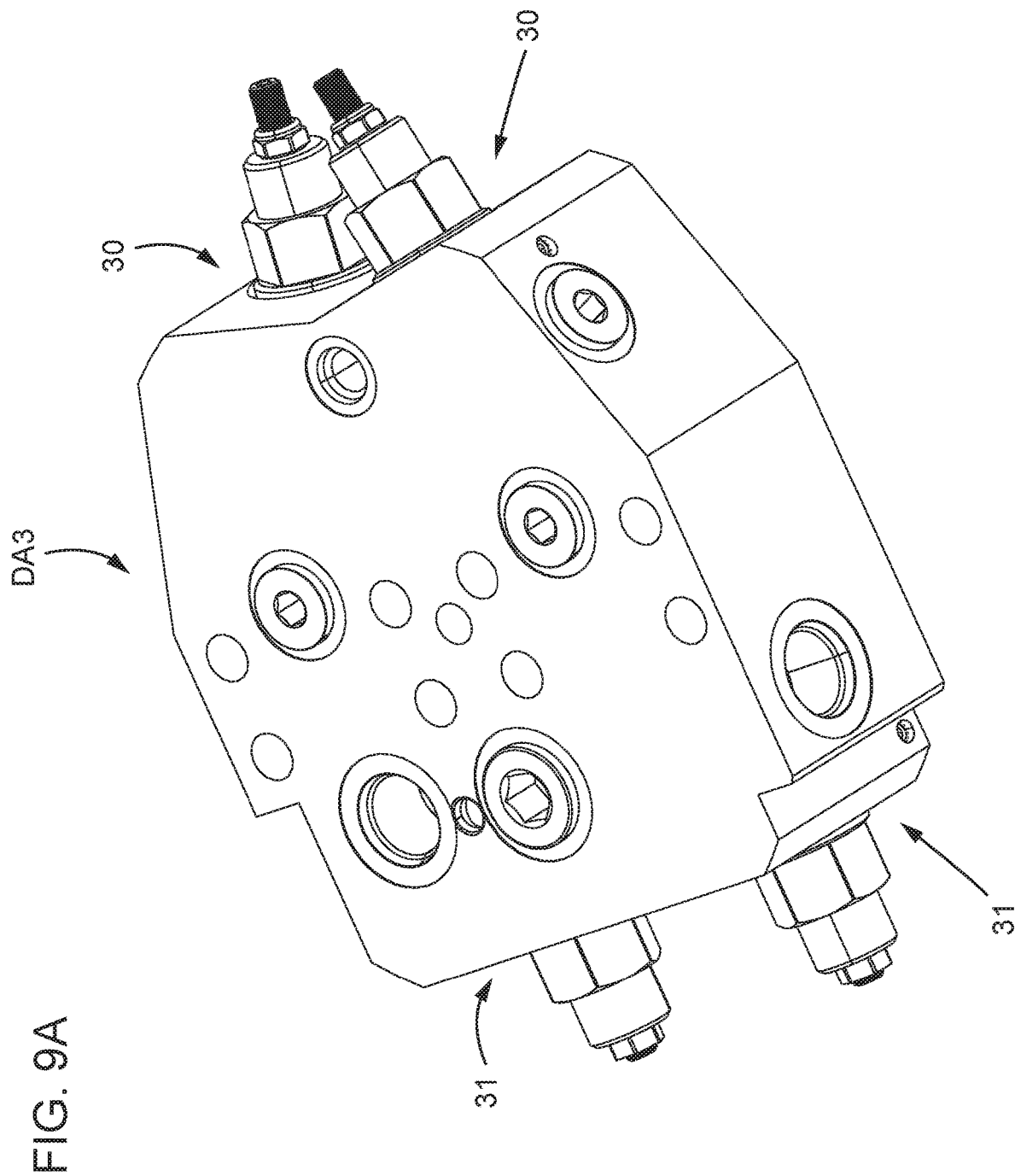

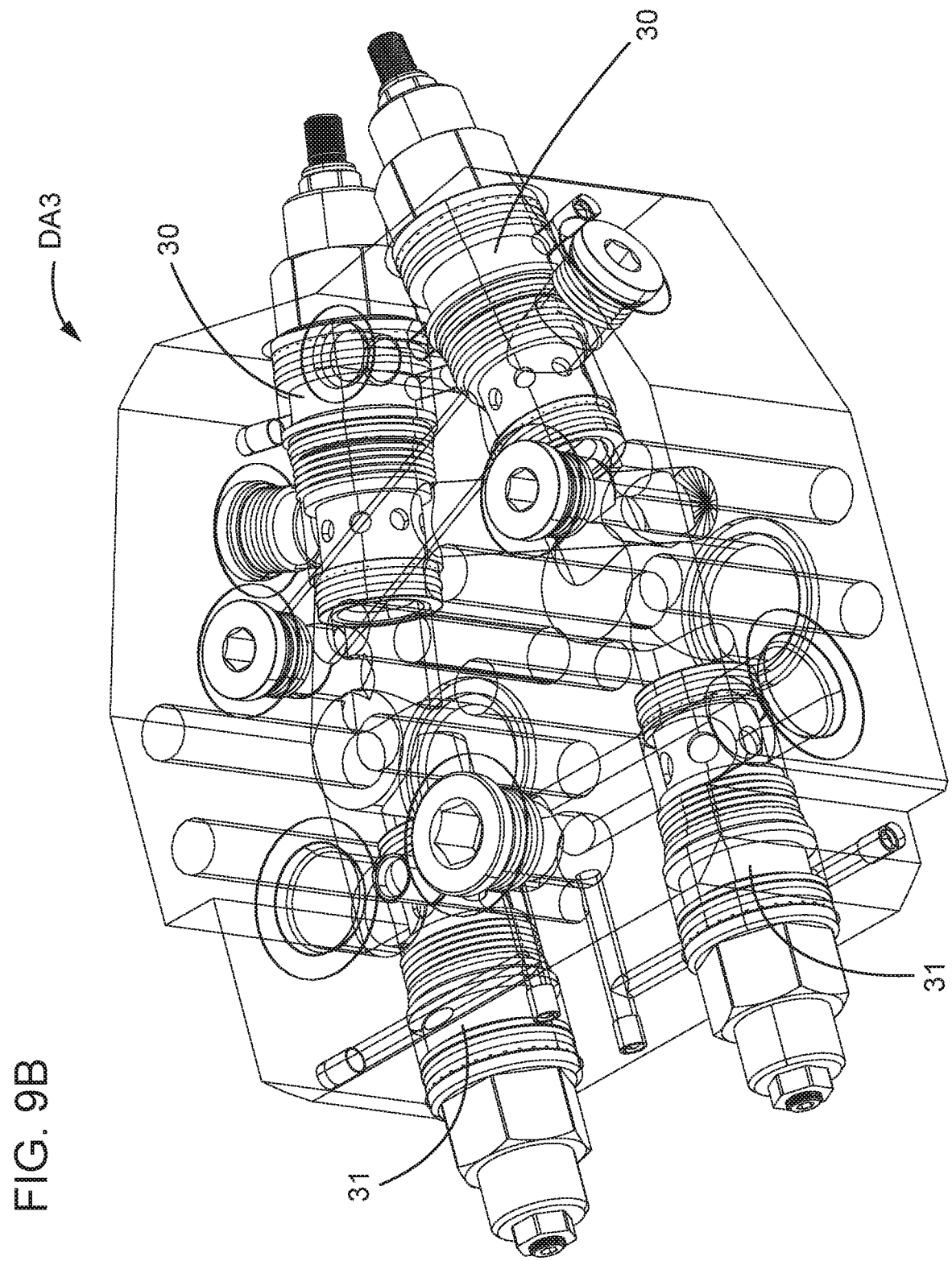

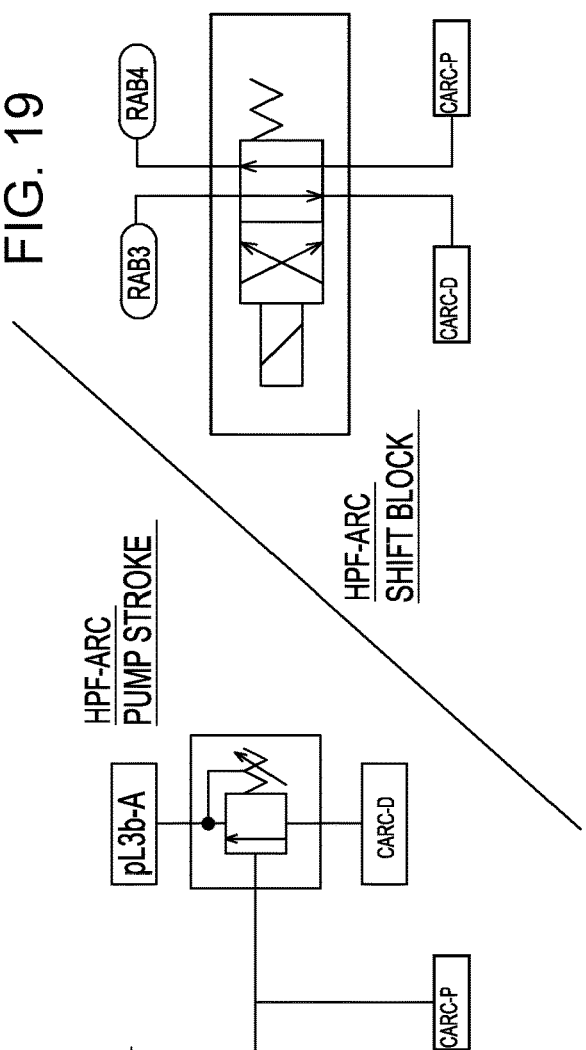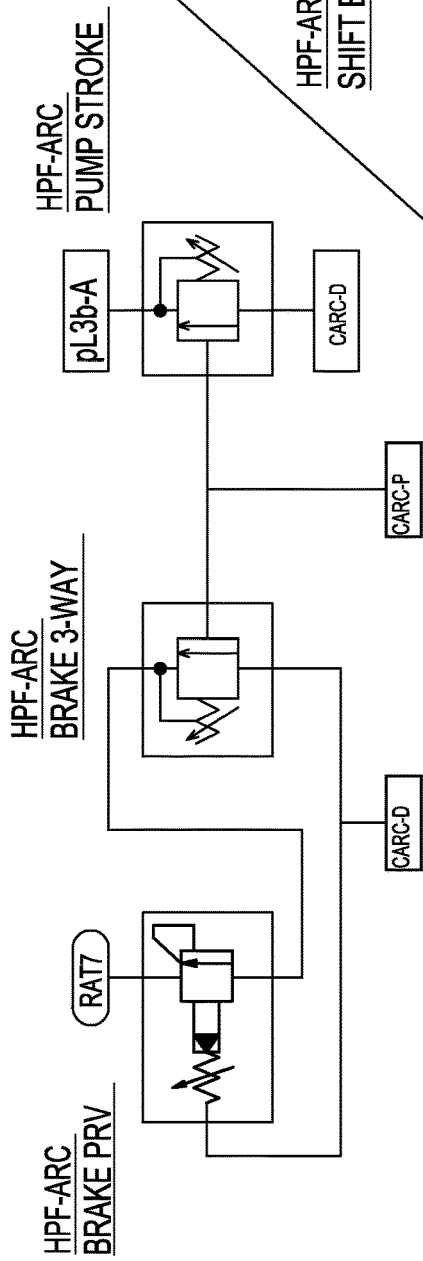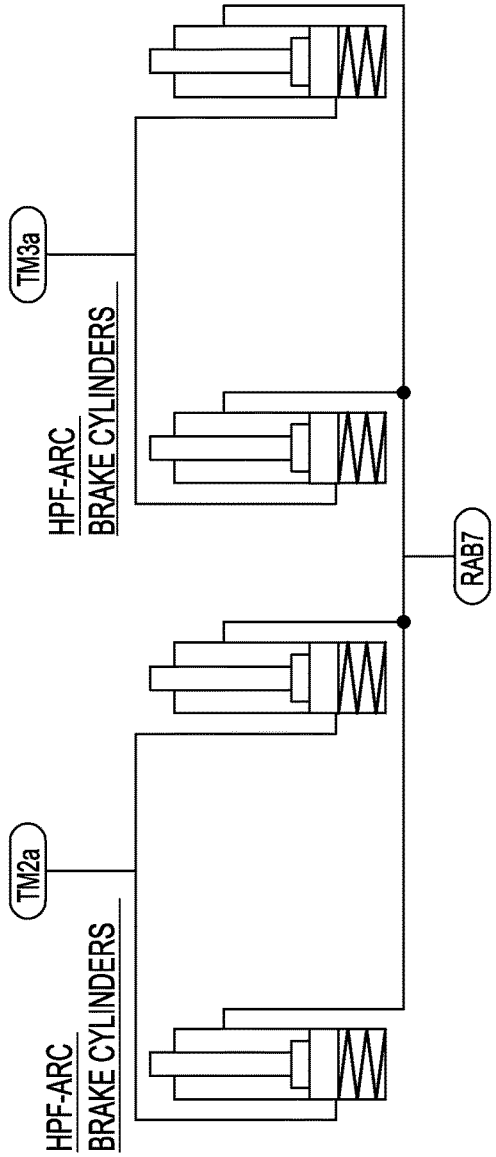
FIG. 18
FIG. 19
FIG. 20

HYDRAULIC MOTOR DRIVE ASSEMBLY AND SYSTEM AND METHOD OF USE THEREOF

CROSS-REFERENCE TO RELATED APPLICATION

This application is based upon and claims the benefit of U.S. Provisional Application No. 62/508,592 filed on May 19, 2017, the entire contents of which are incorporated herein by reference.

FIELD OF THE INVENTION

Aspects of the disclosure relate generally to railroad construction equipment; namely, an assembly for a mobile platform that combines rail line functionality and standard excavation and/or other mobile platform functions. More specifically, aspects of the disclosure relate to hydraulic motor drive assembly contained within a drive arm assembly mounted to the front and back side of the mobile platform, which enable the platform to lift and lower rail wheels so that an excavator or other mobile platform is able to run bi-directionally and independently along the rails.

BACKGROUND

There are many types of railroad construction equipment that comprise a mobile platform that is able to travel on and off railroad tracks, including excavators, commonly used to dig the trenching for new railroad tracks, perform railroad maintenance, clear brush below roadbed level, and clean culverts around railroad tracks.

Excavators with hydraulic drive systems are widely used in the related art relating to railroad construction. The two main sections of an excavator are the house and the undercarriage. With referenced to FIG. 1, the house of a mobile platform 100, such as an excavator is the rotating platform 1 that includes the operator cab 2, counterweight 3, boom 4, stick 5, and bucket 6, as well as the engine, fuel, and hydraulic oil tanks. The house attaches to the undercarriage 9 (FIG. 2) by way of a swivel bearing 10. High pressure oil is supplied to the tracks' hydraulic motors (such hydraulic transfer of pressure also interchangeably being referred to herein as "hydraulically communicating" or components being "hydraulically coupled") through the swivel bearing at its axis, allowing the machine to slew 360 degrees unhindered. As shown in FIG. 1, the undercarriage 9 is equipped with a pair of tracks or wheels 7, which include grousers and may include pads 8. All movement and functions of a hydraulic excavator are accomplished through the use of hydraulic fluid via use of hydraulic cylinders and hydraulic motors.

The engine in a standard hydraulic excavator, for example, serves to drive the hydraulic pumps. Generally, a hydraulic excavator comprises two variable displacement pumps that supply oil at high pressure to the arms, swing motor, track motors, and accessories.

An excavator is a very useful tool in the railroad industry, but many railroad systems extend out into remote locations that make railroad maintenance and repair difficult, since transporting railroad construction equipment, such as an excavator, to remote locations often proves challenging and costly. The process for related art railroad maintenance, for example, typically includes trucking an excavator to a rail site, hoisting and bolting it onto a rail car, and then pulling the rail car with the loaded excavator by locomotive to the site(s) being maintained.

Such related art railroad maintenance processes may be replaced with other related art solutions, wherein the excavator itself incorporates a platform that allows it to travel directly on the railroad tracks, commonly referred to as a "high rail" platform, as shown in FIG. 3. Such a platform typically comprises steel rail wheels used on traditional rail cars, which are attached to the frame of the excavator so that such excavator is able to travel on railroad tracks.

One example related art high rail platform comprises two sets of rail wheels, with each set having a mechanism to raise and lower the rail wheels onto the railroad tracks. One set of wheels is inserted between the leading edge of the tracks of the excavator adjacent to the tracks and the other set is inserted between the trailing edge of the tracks. When both sets of rail wheels are engaged on the railroad tracks, the excavator tracks are elevated from the ground so that excavator is able to ride upon the railroad tracks using the rail wheels. When both sets of rail wheels are disengaged, the excavator tracks are in contact with the ground, thereby allowing the excavator to move about.

However, there are mobility and safety problems with using such high rail platforms of the related art, because for example, when the rail wheels are engaged on the track, the house rises beyond the excavator's normal center of gravity, rendering it somewhat unstable and with a tendency for derailment.

Recent improvements to the high rail system include a "high and wide" platform allowing improved clearance and stability. Such a platform is a purpose-built undercarriage that is heavier and wider than the original factory excavator undercarriage, causing the balance of weight to shift and the center of gravity to lower, thereby making the excavator considerably more stable on the rail lines. With reference to FIG. 4, a platform 14 of such related art systems generally embodies a drive arm assembly 15 that contains a motor drive assembly, which is attached at each end of the platform, wherein rail wheels 16 are mounted and hydraulically powered and controlled. As shown in FIG. 5, the drive arm assembly comprises rail wheels 16, drive box 17, lid 18, drive arms 19, and a hydraulic motor drive assembly 20.

Among the problems that have emerged when using hydraulically powered rail wheels are those particularly involving hydraulic pumps and motors that run independently of each other. In reference to the above hydraulic implementation, typically, the hydraulic pump of a standard excavator pulls hydraulic fluid from the reservoir and pushes hydraulic fluid throughout the machine through hose lines and into the rail motor drive, thereby causing the rail wheels to rotate. The rail motor drive then pushes the hydraulic fluid back out into the reservoir. However, failure occurs when the rail wheels rotate independently from the hydraulic pump system, causing the rail motor drive to behave like a pump, pulling into itself hydraulic fluid from the hose lines, while simultaneously pushing hydraulic fluid back into the machine, causing extreme pressure and compromising the hydraulic system.

In view of the above, aspects of the present disclosure provide improvements to the motor drive assembly that overcome the above problems of the related art, as well as others, and provide additional features that will be apparent from the description provided herein.

SUMMARY

In view of the above, aspects of the present disclosure provide a mechanism that overcomes existing problems in the art, as well as others. More particularly, for example, aspects of the present disclosure may provide a counter balance valve and/or other functions that protect the motor from behaving like a pump. The counter balance valve serves to cut off hydraulic fluid supply from the rail motor drive when the rail wheels are rotating independently of the hydraulic pump system.

In one example variation, aspects of the present disclosure further provide a cross-port relief mechanism that allows for some hydraulic fluid to be supplied back to the rail motor drive when the rail wheels are rotating independently from the hydraulic pump system. Such cross-port relief mechanism creates a closed circuit hydraulic system in proximity to the rail motor drive that may greatly decrease the risk of high pressure damage to components in the system.

In yet other aspects of the present disclosure, a method for mounting the rail wheels to the hydraulic motor drive assembly includes use of a gearbox flange, which is part of the planetary gear reduction drive assembly that engageably operates with the rail wheels and the motor disconnect assembly.

Still more particularly, example aspects of the present disclosure provide a coupler element, which serves as an inner connection between the motor and the disconnect assembly in concentric alignment with the overall motor drive assembly, such that the wheels on either side of the drive box rotate contemporaneously.

Yet additional aspects of the present disclosure provide a motor hub element between the non-motor side of the disconnect assembly that connects to the coupler element, such that a complete assembly is achieved.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

FIGS. 9A and 9b contain views of the example counterbalance valve assembly illustrated in FIG. 6, in accordance with aspects of the present disclosure;

FIG. 18 shows a representative hydraulic diagram of an example brake pressure reducing valve (PRV), which controls the external braking system, in accordance with aspects of the present disclosure;

FIG. 19 shows a representative hydraulic diagram of a shift block, which controls shift between rails and track, in accordance with aspects of the present disclosure; and FIG. 20 shows a representative hydraulic diagram of example brake cylinders for use an example brake PRV of FIG. 18.

DETAILED DESCRIPTION

Aspects of the present disclosure relate to a motor drive assembly for selective rail or track operation of an excavators or other mobile platform via a source of hydraulic pressure. The motor drive assembly may include one or more drive arm assemblies mounted at ends of the mobile platform underbody, with the drive arm assembly including a motor, a gearbox, and hydraulic features for operation, including a counterbalance valve assembly, as well as improved gearbox and coupler elements operable therewith. The counterbalance valve assembly may include a cross-port relief valve and may have a first hydraulic operating circuit and a second hydraulic operating circuit. The first hydraulic operating circuit may communicates hydraulic pressure to the gearbox to enable movement of the mobile platform, and the second hydraulic operating circuit may prevent undesired communication of hydraulic pressure to the gearbox.

Figure 1:
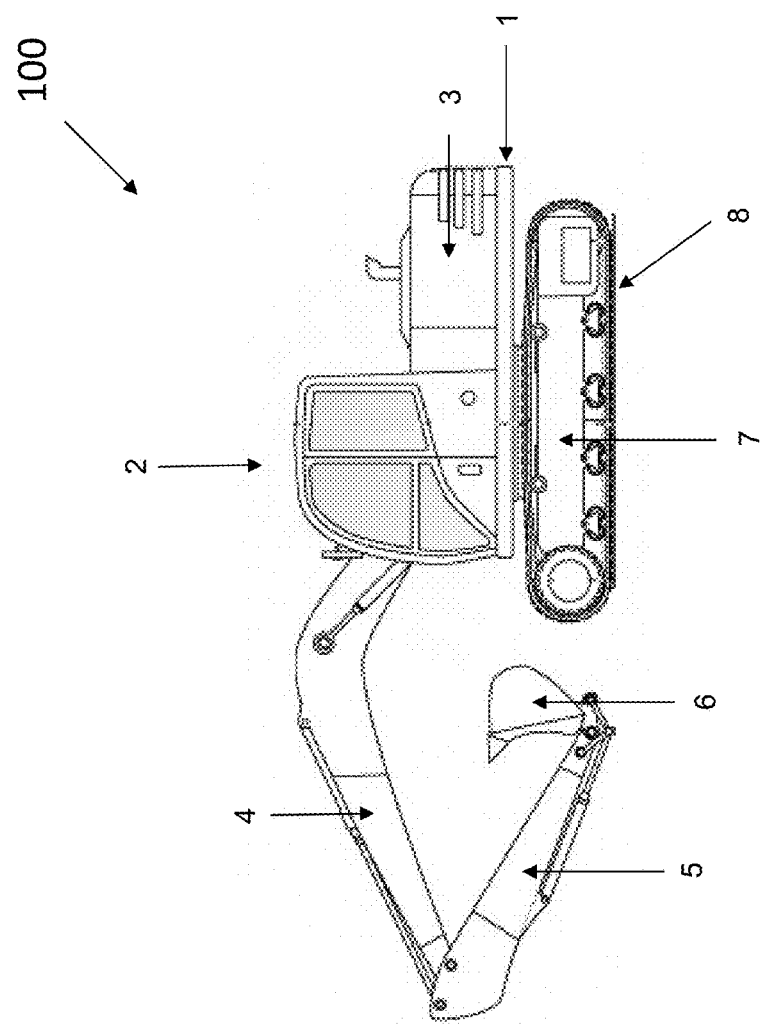
FIG. 1 is a side elevational view of an example multi-function assembly in accordance with the related art.

Turning now to the drawings, there is illustrated in FIG. 1 an example mobile machine 100, such as an excavator, having various features that are usable in accordance with aspects of the present disclosure. As shown in FIG. 1 these features include two (2) main sections: a house; and an undercarriage. The house includes a cab 2 which is mounted to a frame (not shown in FIG. 1), which in turn is carried by two laterally spaced tracks 7 (only one track is shown in FIG. 1), which are used to propel the mobile machine 100.

Figure 2:
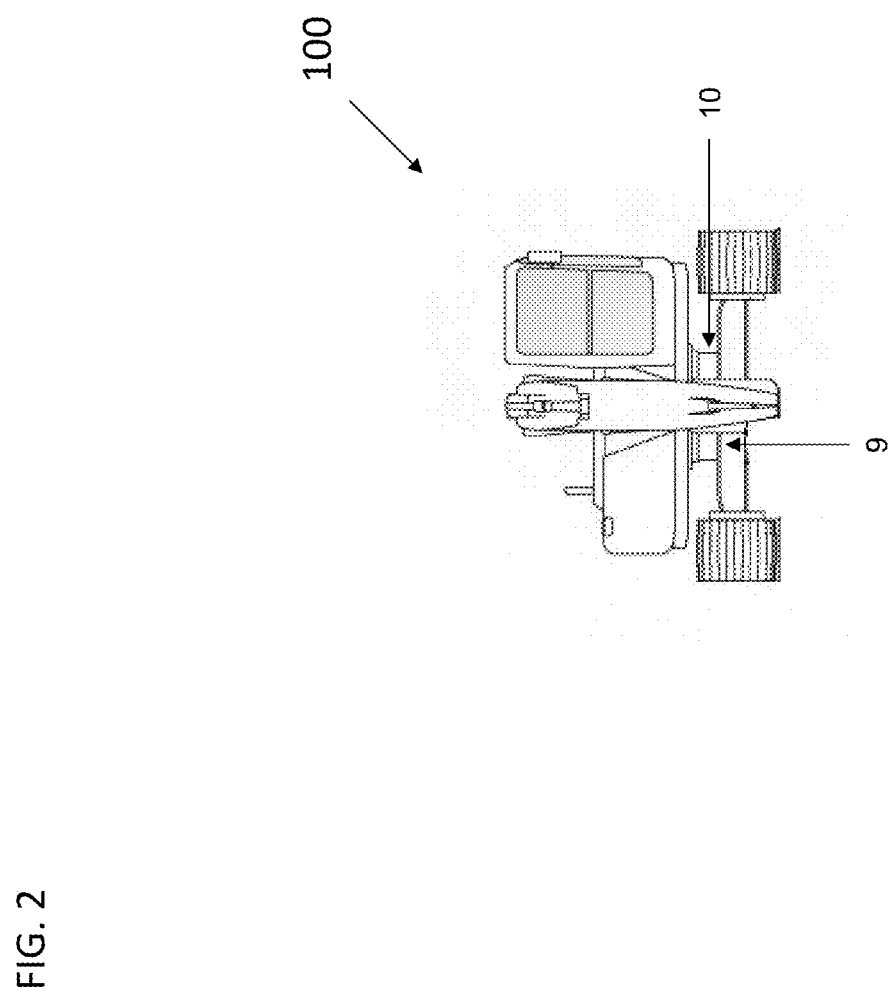
FIG. 2 is a view similar to FIG. 1, but showing a front view of an example multi-function assembly of the related art, various features of which may be used in accordance with aspects of the present disclosure.

FIG. 2 illustrates various additional features of the mobile machine 100 of FIG. 1 that are usable in accordance with aspects of the present disclosure. FIG. 2 shows a front view of mobile machine 100, showing various structural attributes, including an undercarriage 9 and a swivel bearing 10.

Figure 3:
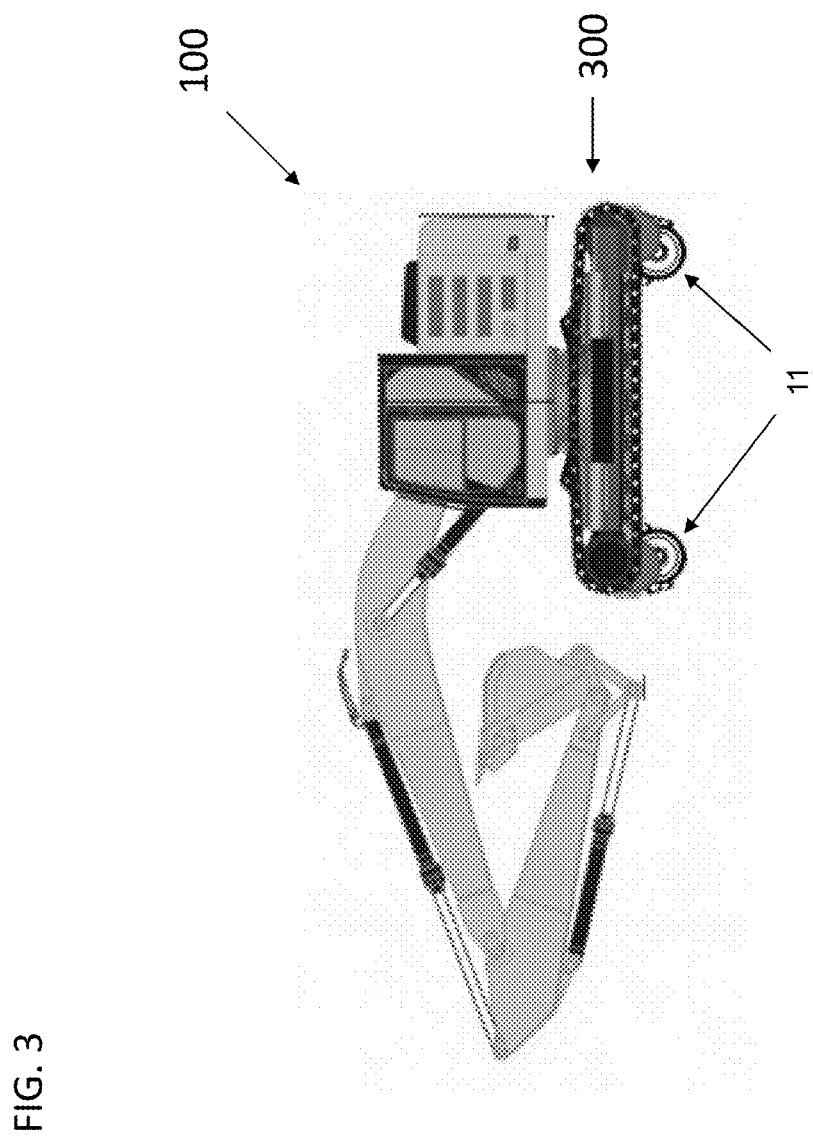
FIG. 3 is a view similar to FIG. 1, but shows an example multi-function assembly on a "high rail" platform with rail wheels for travel on railroad tracks of the related art, various features of which may be used in accordance with aspects of the present disclosure.

Turning now to FIG. 3, illustrated are yet additional features of an example mobile machine 100 that are usable in accordance with aspects of the present disclosure, including a "high and wide" platform 300 embodying, among other things, a pair of conventional rail wheels 11.

Figure 4:
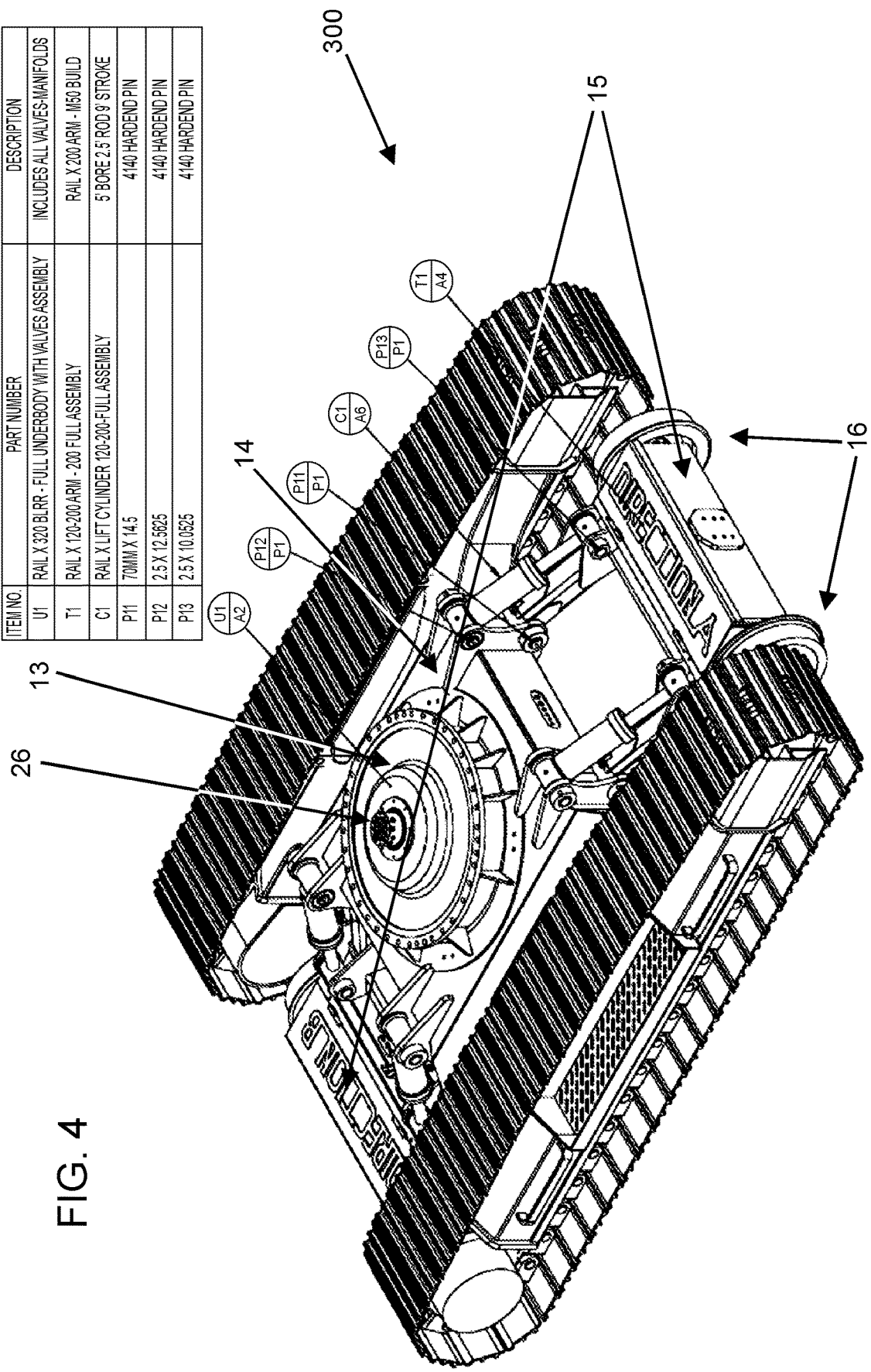
FIG. 4 is a top elevational view of a "high and wide" undercarriage, to which the house of an example multi-functional assembly of the related art may be attached, various features of which may be used in accordance with aspects of the present disclosure.

FIG. 4 shows the platform 300 of FIG. 3, which includes a purpose-built undercarriage comprising, among other things, a rotary union 26, which attaches to a swivel bearing 13 that is mounted into the underbody 14, and high rail mechanisms, including drive arm assemblies 15 having rail wheels 16, that allow the excavator to travel along the rails. Such an undercarriage has an increased footprint because it is higher, wider and heavier than typical factory excavator undercarriages, for example.

Figure 5:
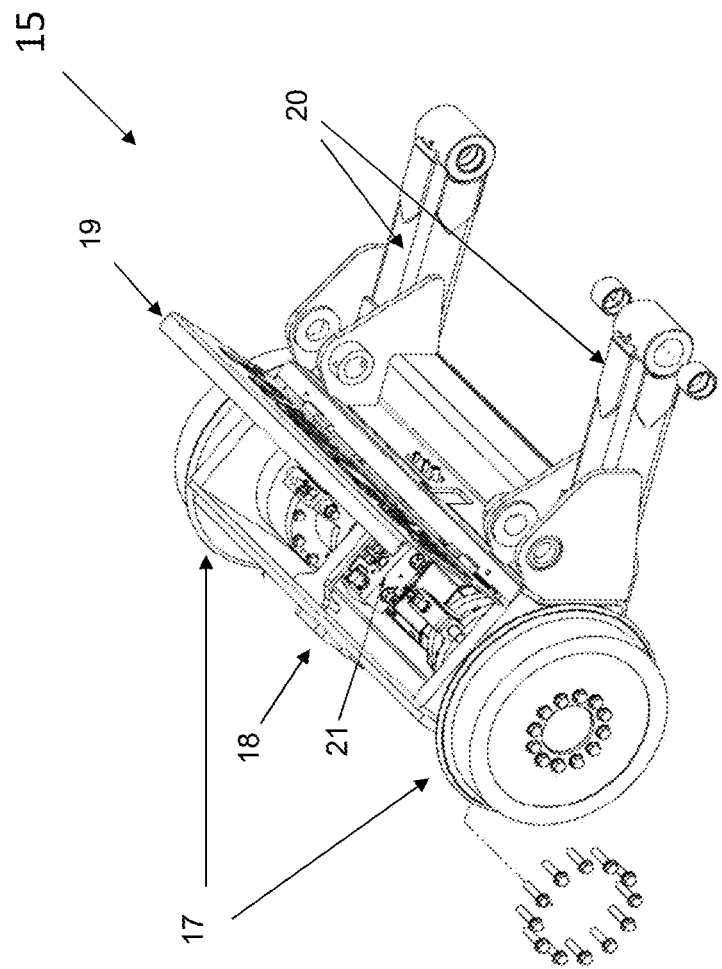
FIG. 5 is a perspective view of a high rail mechanism of the related art, various features of which may be used in accordance with aspects of the present disclosure.

Turning now to FIG. 5, illustrated is a perspective view of portions of a high rail mechanism that include one of the two drive arm assemblies 15 of FIG. 4, which generally comprise rail wheels 17, drive box 18, lid 19, drive arms 20, and a hydraulic motor drive assembly 21, various features of which may be used in accordance with aspects of the present disclosure.

Figure 6:
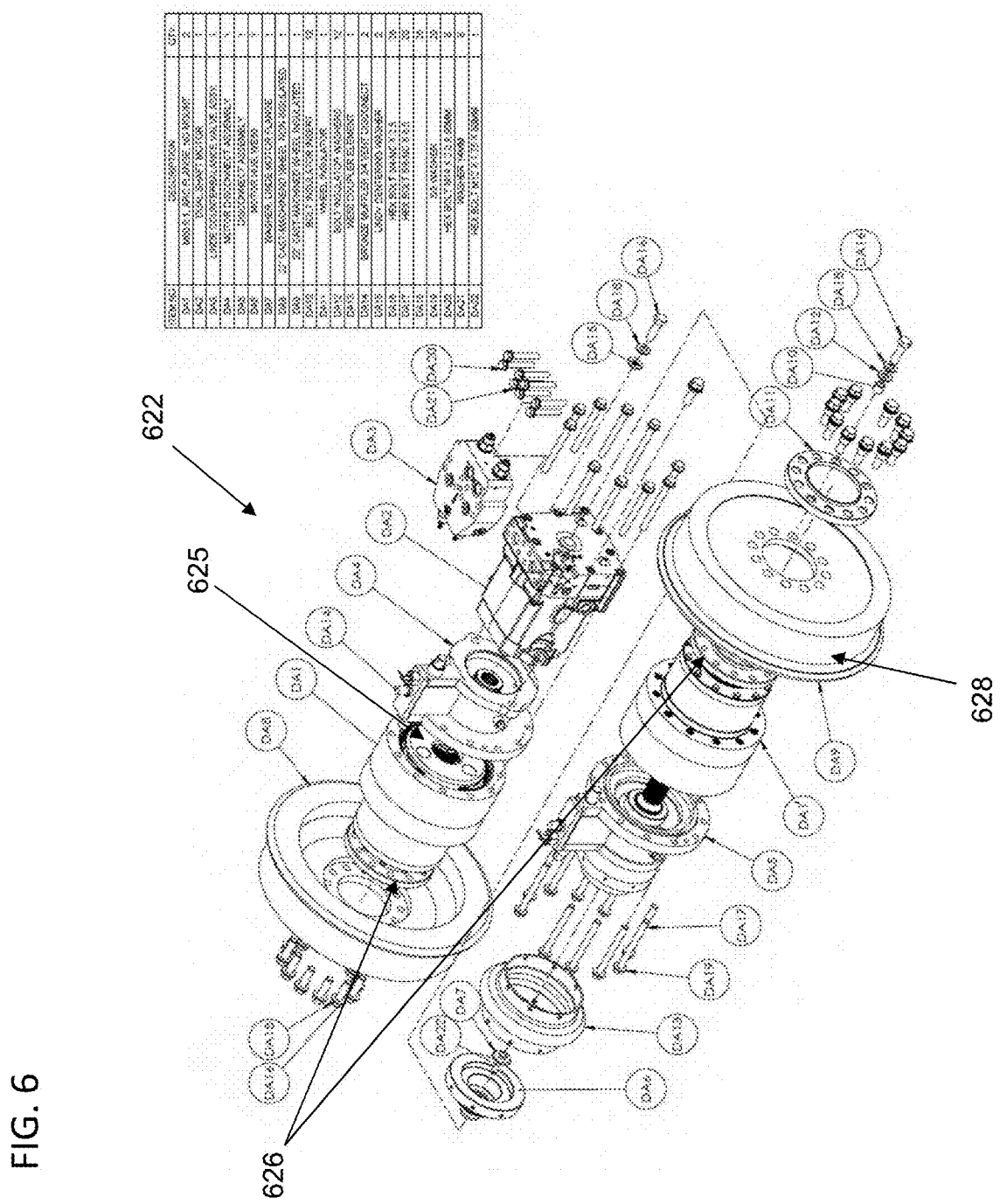
FIG. 6 is an exploded perspective view of an example hydraulic motor drive assembly in accordance with aspects of the present disclosure.

FIG. 6 shows an exploded view of an example hydraulic motor drive assembly 622, which may be used, for example with other components of the drive arm assemblies 15 of FIG. 5 and/or the mobile platform 100 and/or the platform 300 of FIGS. 1-5. The example hydraulic motor drive assembly 622 shown in FIG. 6 is concentrically constructed and operates along a single lateral row moving axially with the rail wheels. The hydraulic motor drive assembly 622 has two planetary gear reduction drives (gearboxes) DA1, DA1' that act as differentials for transmitting power to the rail wheels, which are situated between each rail wheel DA8, DA9 and motor disconnect assembly DA4, DA5. The gearbox DA1 includes a flange 626, partially shown along the outer edge of the gearbox housing resembling a disc, and having a fixed solid core that protrudes horizontally into the gearbox interior (not shown), which is sized sufficiently to accommodate the various transmission elements included in a gearbox. The wheels are bolted to the gearbox flange.

Each gearbox DA1, DA1' also includes a drive train planetary carrier 625. The carrier 625 is visible on the right side in the sectional view of the first gearbox DA1, as shown in FIG. 6, which illustrates one half of the hydraulic motor drive assembly 622, situated inside the gearbox housing (see, e.g., drive box 18 of FIG. 5). The carrier 625 connects to the motor disconnect assembly DA4, which is bolted to the motor DA2. As the carrier 625 turns, it delivers low-speed, high-torque output at a 6:1 ratio to the wheels.

The second gearbox DA1', illustrated in the bottom half of the hydraulic motor drive assembly 622, as shown in FIG. 6, connects a carrier (not shown), to a second motor disconnect assembly DA5, which in turn connects to the dual shaft motor DA2 via a coupler element (or adapter) comprising a motor hub DA6 and a washer DA7, which mounts the hub DA6 to the motor DA2. A coupler DA13 connects the hub DA6 to the motor disconnect assembly DA5. The motor hub DA6 and coupler DA13 are concentrically designed to achieve alignment with the motor disconnect assembly DA5, which in turn achieves concentric alignment with the overall hydraulic motor drive assembly. The motor hub DA7 fits inside the left side of the coupler DA13, and the motor disconnect assembly DA5 fits inside the right side of the coupler DA13, all of which are bolted together utilizing the bolt holes illustrated therein.

The motor disconnect assemblies DA4, DA5, serve to operationally disconnect the motor DA2 from the wheels, so that the wheels may rotate freely, and to operationally reconnect the wheels to the motor DA2 when the motor DA2 is engaged.

The dual shaft, high pressure motor DA2 may comprise, for example, a variable 2-speed hydraulic motor that transfers continuous power torque to the differentials and thereby delivers power to the rail wheels. The counterbalance valve assembly DA3, which attaches to the motor DA2, is the mechanism that protects the motor DA2 from behaving like a pump by cutting off hydraulic fluid supply from the rail motor drive when the rail wheels are rotating independently of the excavator's hydraulic pump system. The counterbalance valve assembly DA3 incorporates a cross-port relief mechanism that creates a closed circuit hydraulic system, allowing for some hydraulic fluid to be supplied to the rail motor drive when the rail wheels are rotating independently of the hydraulic pump system.

Figure 7:
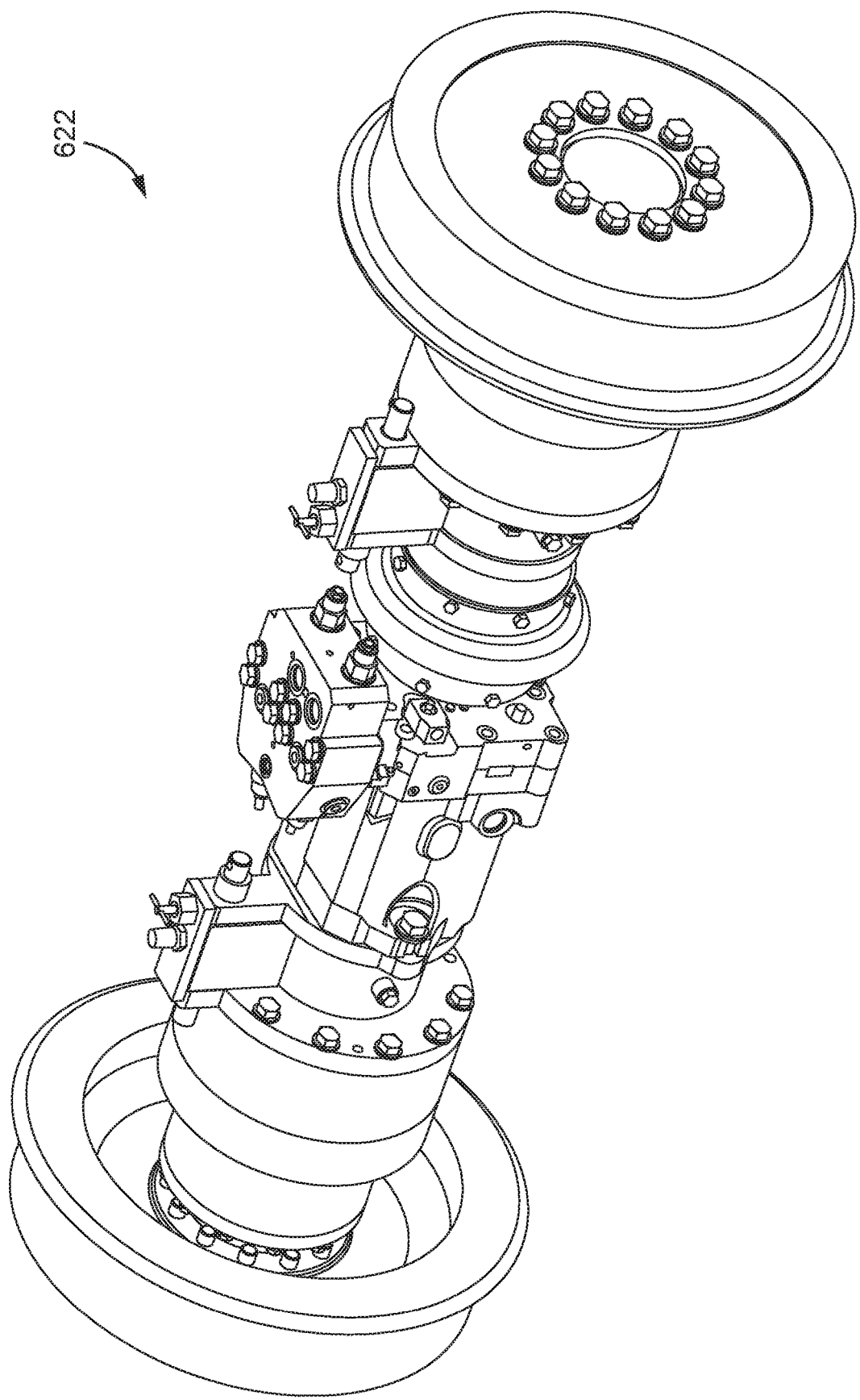
FIG. 7 is a view similar to FIG. 6, but shows a side elevational view of the hydraulic motor drive assembly in accordance with aspects of the present disclosure.

FIG. 7 illustrates a side view of a similar completed assembly 622 to that as shown in FIG. 6.

Figure 8:
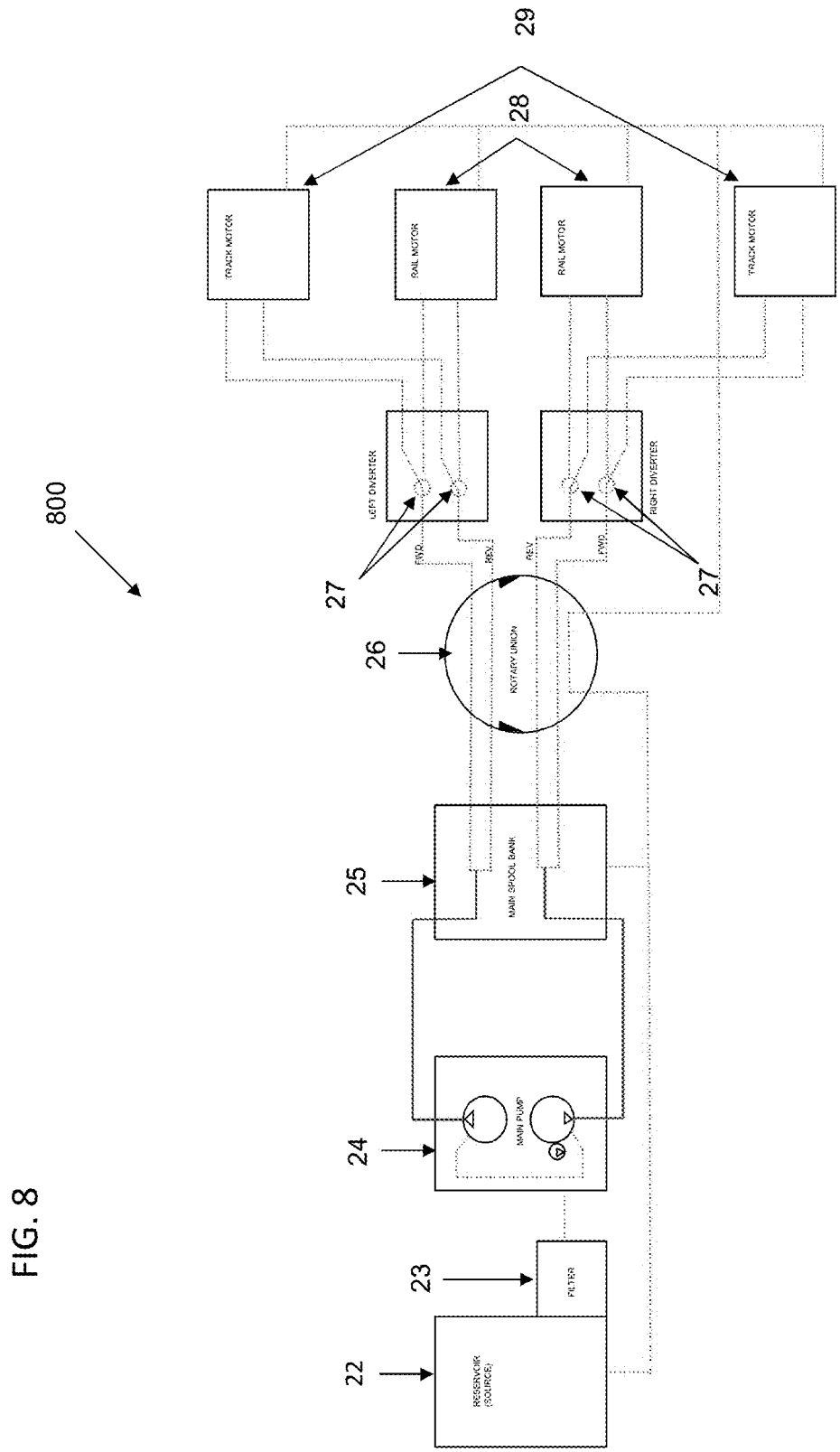
FIG. 8 contains a schematic representative diagram of an example hydraulic power system for a "high and wide" high rail system, in accordance with aspects of the present disclosure.

FIG. 8 contains a representative schematic diagram of an example hydraulic power system 800 for a "high and wide" high rail system, in accordance with aspects of the present disclosure. As shown in FIG. 8, the main pump 24 (see FIG. 15 and corresponding description below for further hydraulic system operational details of the main pump; see e.g., main hydraulic pump 1501 and related hydraulic operational features) supplies hydraulic fluid from a reservoir 22 to the main spool bank 25 (see FIG. 17 and corresponding description below for hydraulic system operational details of the main spool bank). The main spool bank 25 may be, for example, a hydraulic control mechanism of an excavator or similar hydraulically operated features of a mobile platform that controls multiple hydraulic functions throughout the entire excavator (e.g., swing right/left, boom up/down, stick in/out, bucket in/out), including the travel function (i.e., right fwd/rev, left fwd/rev). The hydraulic hose lines related the travel functionality in the main spool bank 25 communicate hydraulic pressure via a rotary union 26 (see FIGS. 11-11C and corresponding description below for hydraulic system operational details of the rotary union), which serves to integrate multiple independent flow channels (passages) for the transfer of hydraulic fluid to the undercarriage and specifically to the diverters 27. The diverters 27 (e.g., including six way diverter valves) are then controlled by a pilot source (e.g., to control switch activation) from the main control valve 25, which thereby controls the supply of hydraulic fluid pressure either to the track motor drive train or the rail motor drive train. The switching (i.e., via the diverters 27) may be operator controlled via an electrically operated switch, or other electronic, mechanical, or other non-electrically operated control, for example, from the cab of the excavator to thereby effectuate operation of the track motor drive train or rail motor drive train.

As representatively illustrated in FIG. 8, the diverting valves 27 govern the amount of fluid power supplied to the rail motor drive train 28 when propelled by the hydraulic pump 24 of the mobile device through the driving of hydraulic fluid through to the rail motor train 28, thereby causing the rail wheels to rotate. However, as discussed above, failure in the related art may occur when the rail wheels rotate independently from being driven by the hydraulic pump system, such as when a mobile vehicle may tend to roll down an inclined rail section, thereby causing the rail motor drive 28 to behave like a pump, pulling into itself hydraulic fluid from the hose lines, while driving hydraulic fluid back into the direction of the reservoir 22 of the excavator, thereby potentially causing extreme pressure back into, for example, the main spool bank 25 and/or main pump 24, which may ultimately cause one or more components of the hydraulic system to explode, rupture, or otherwise be damaged.

FIGS. 9A and 9B contain views of the example counterbalance valve assembly DA3 illustrated in FIG. 6. FIG. 9A is a perspective view of the counterbalance valve assembly DA3, and FIG. 9B show a visible view of the counterbalance valve assembly DA3. This hydraulic integrated circuit (HIC) assembly, in accordance with aspects of the present disclosure, may mount directly to the motor and serve the dual purposes of providing counterbalance and cross port relief with anti-locking protection, the details of operation of an example portion of which are further shown schematically in, and described in conjunction with regard to, FIG. 10.

Figure 10:
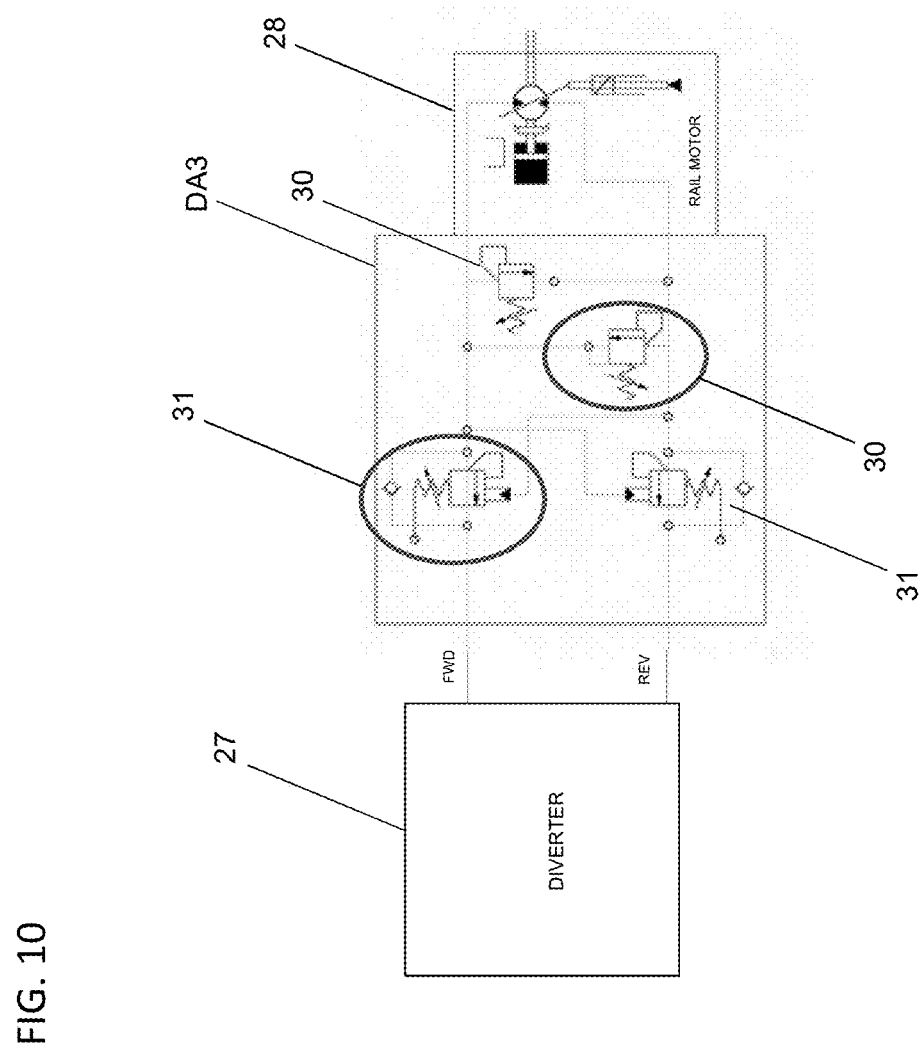
FIG. 10 is a schematic diagram of the diverter and counterbalance valve assembly portions of the hydraulic power system of FIG. 8.

FIG. 10 shows a detailed view of the diverter and counterbalance valve assembly portions of the hydraulic power system 800 of FIG. 8. As shown in FIG. 10, a counterbalance valve 31 (also interchangeably referred to herein as a counterbalance cartridge, a counterbalance valve assembly, or counterbalance HIC) within the counterbalance assembly portion DA3 of a hydraulic circuit may be operatively connected to (e.g., hydraulically communicate with) the diverter 27, and may function to provide full-flow load during normal operation, while preventing backflow during a hydraulic hose or other component failure, or limit overrun of full-flow load when the rail wheels are rotating independently from the hydraulic pump system.

Figure 10A:
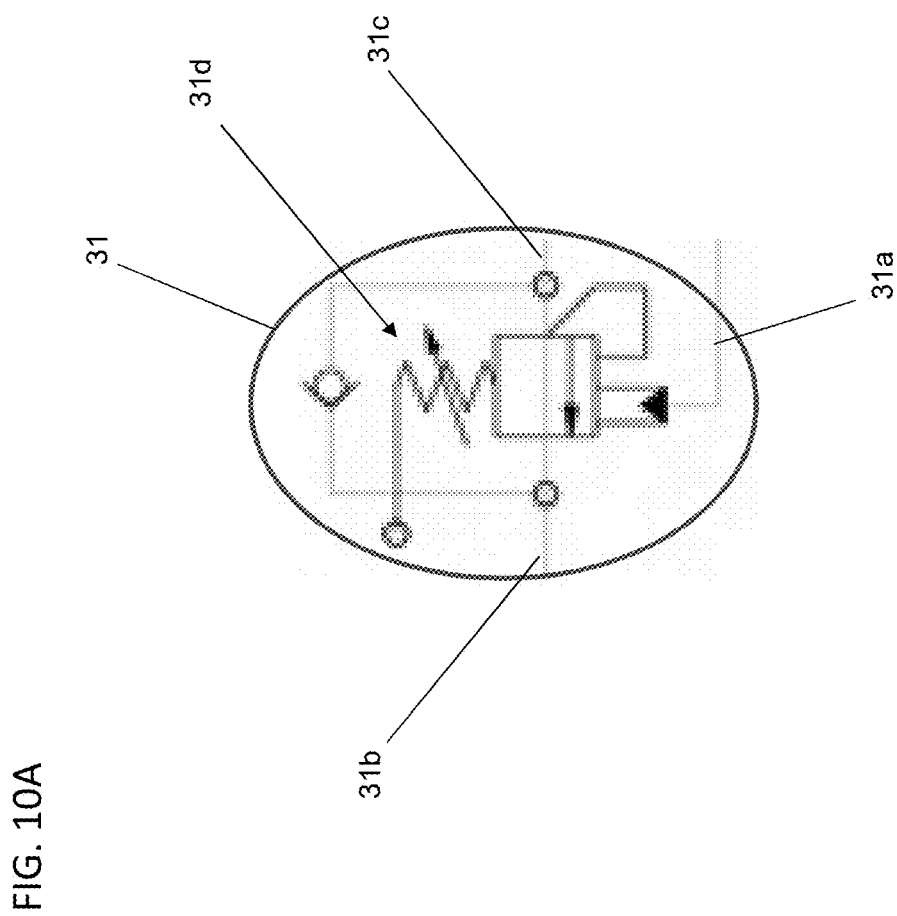
FIG. 10A is a close up schematic diagram of a cross-port relief cartridge for the assembly portions of FIG. 10.

For example, as shown in FIG. 10, the counterbalance assembly portion DA3 may include two counterbalance valves 31. Within each counterbalance valve 31 (see, e.g., close-up view of FIG. 10A), a pilot pressure 31a may be received by the counterbalance valve 31 to enable/disable flow through the valve 31, for example, from received flow 31b to exit flow 31c when the rail motor 28 (FIG. 10) is being driven in the forward direction. The pressure transmitted through the counterbalance valve 31 (e.g., from 31b to 31c) may be adjusted via pressure adjustment feature 31d (e.g., a valve). The counterbalance assembly portion DA3 thereby utilizes a shuttle valve for load sensing feedback.

The counterbalance assembly portion DA3 may be configured with dual pressure ports (A and B, FIG. 9A), which provide backpressure to hold a load on the motor, thereby allowing free wheel rotation when the control valve shifts to the neutral position. Counterbalance valves 31 usable in an example counterbalance assembly portion DA3 may be or include device part number CBGGLJN, made by Sun Hydraulics of Sarasota, Fla., for example, which may be preset at 4000 PSI.

Figure 10B:
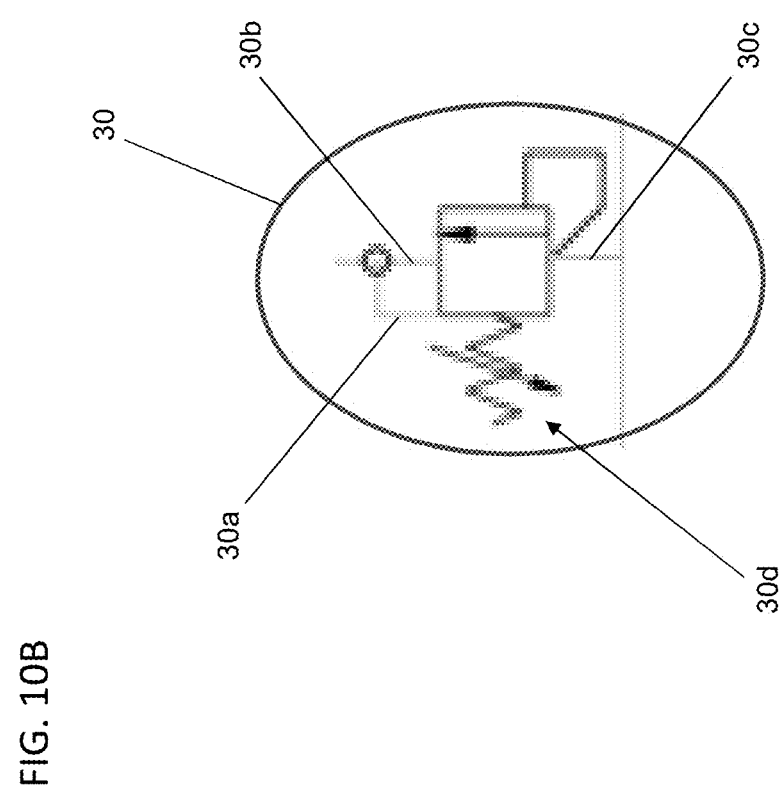
FIG. 10B is close up a schematic diagram of a counterbalance valve for the assembly portions of FIG. 10.

As further shown in FIG. 10, full-flow pressure relief and/or torque limitation for the system may also involve use within the counterbalance assembly portion DA3 of two cross-port relief cartridges 30, also interchangeably referred to herein as cross-port relief HICs or cross-port relief valves. A close-up view of an example cross-port relief cartridge 30 usable in accordance with aspects of the present disclosure is shown in FIG. 10B. The cross port relief cartridge 30 protects the motor from hydrolocking by allowing additional flow to the motor through the drain port when the motor overruns the pump, for example. The cross-port relief cartridge 30 controls maximum torque of the motor and provides overpressure protection for the work ports, thereby enabling bypass of all motor flow when pressure reaches the relief setting. In operation, for example, a received pressure 30a enables/disables flow between points 30b and 30c. The pressure transmitted through the cross-port cartridge 30 (e.g., from 30b to 30c) may be adjusted via pressure adjustment feature 30d (e.g., a valve). Cross-port relief cartridges 30 usable in an example counterbalance assembly portion DA3 may be or include, for example, device part number RSHSLCN made by Sun Hydraulics of Sarasota, Fla.

FIGS. 11-20 show example hydraulic system diagrams for various components usable in accordance with aspects of the present disclosure.

Figure 11:
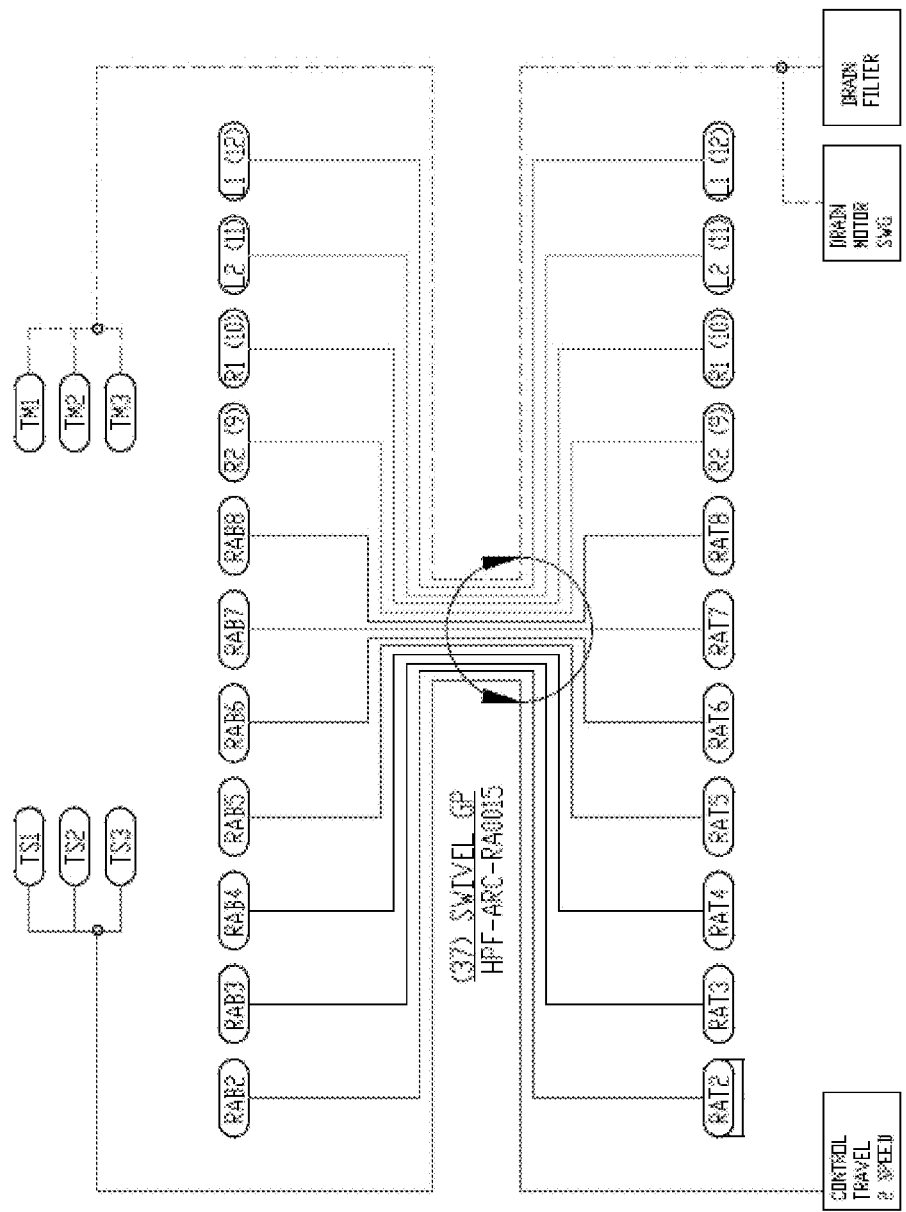
FIG. 11 shows a hydraulic system diagram for an example rotary union for use in accordance with aspects of the present disclosure.

FIG. 11 shows a hydraulic system diagram for an example rotary union for use in accordance with aspects of the present disclosure. The rotary union allows hydraulic pressure to be communicated, for example, as shown in FIGS. 1-3, from a reservoir, which may be housed, for example, in a rotary portion 1 of the mobile platform 100, to the rail motors and other features within the undercarriage 9. The rotary union allows the transmission of pressure among such components, without restriction that could result, for example, from operation the rotation of the rotary portion 1 if hoses or other restrictive connecting features were instead to be used for these fluid communications.

Figure 11A:
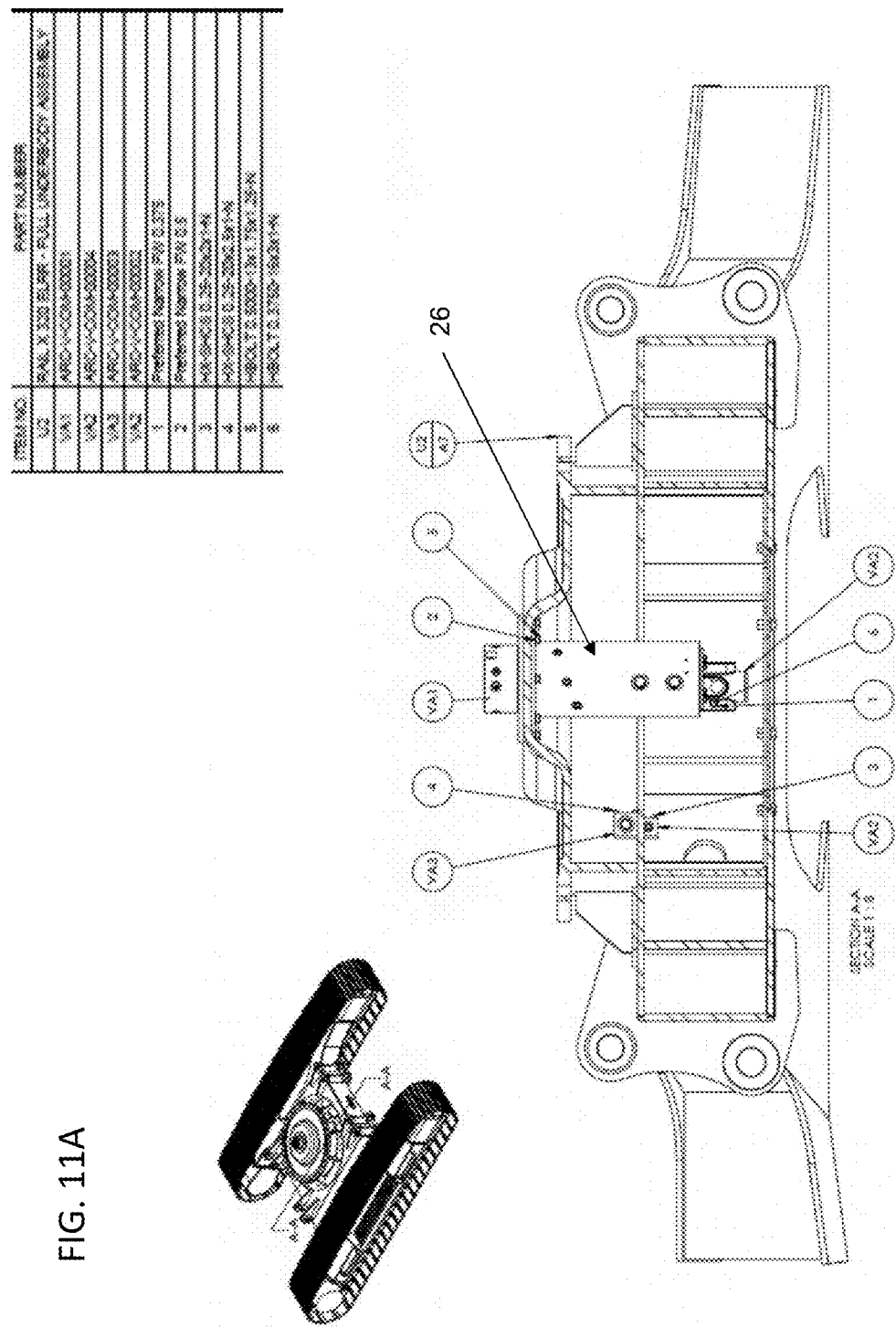
FIG. 11A shows a cross-sectional view of various features of a rotary portion of an example mobile platform, in accordance with aspects of the present disclosure.

FIG. 11A shows a cross-sectional view of various features of a rotary portion of an example mobile platform, as shown, for example, in FIG. 4, including a cross sectional view of an example rotary union 26, in accordance with aspects of the present disclosure.

Figure 11B:
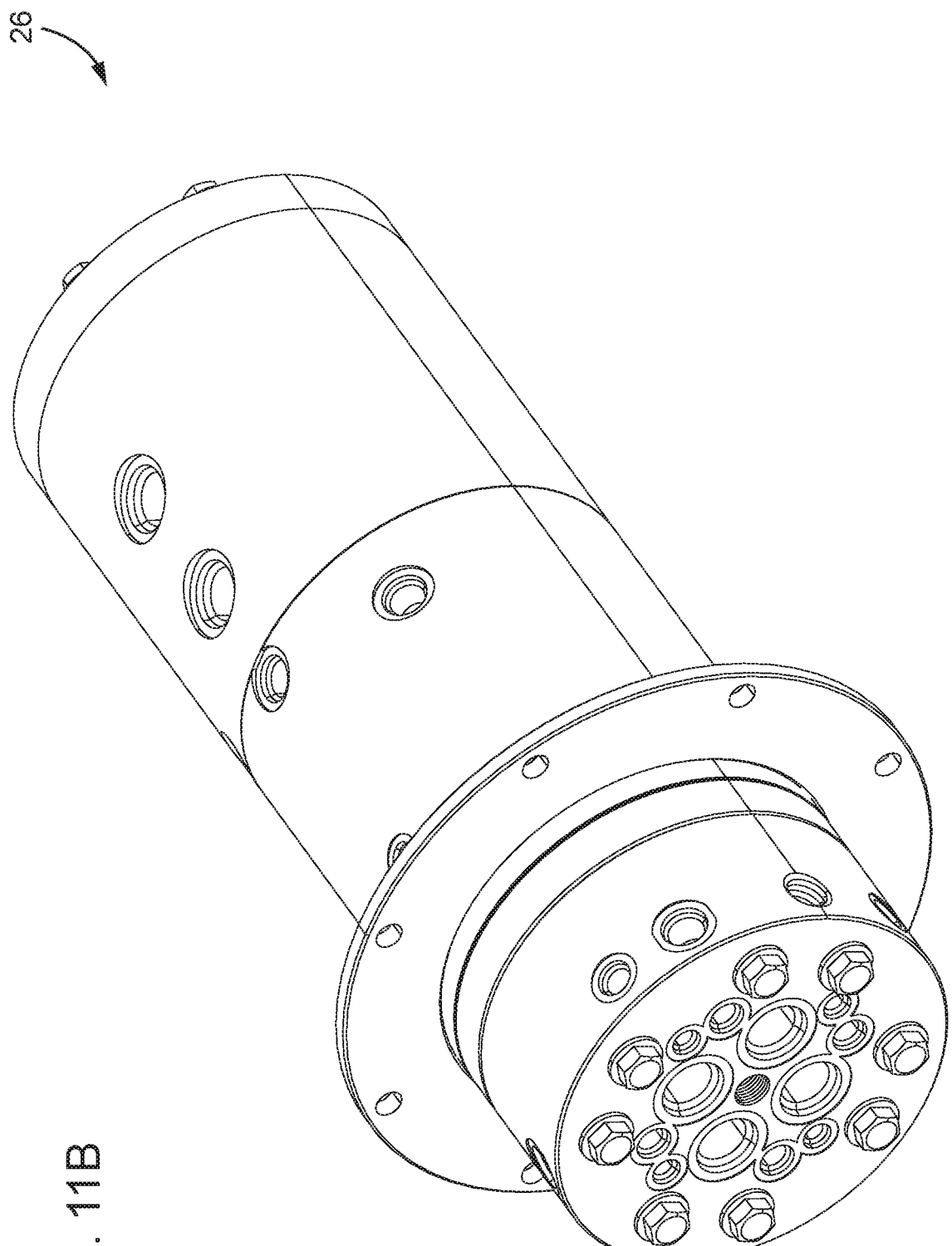
FIG. 11B shows a perspective view of the example rotary union of FIG. 11A.

FIG. 11B shows a perspective view of the example rotary union 26 of FIG. 11A.

Figure 11C:
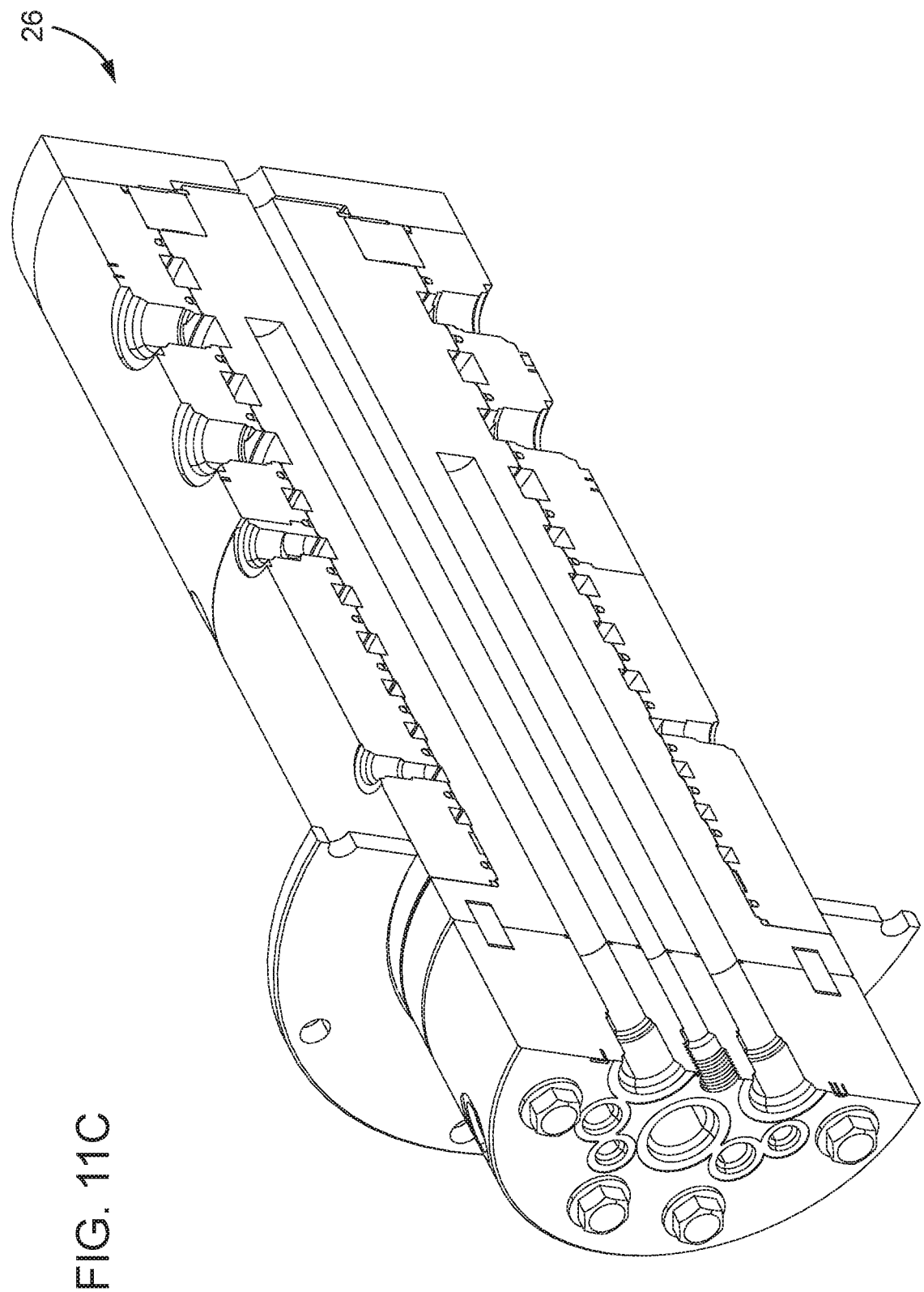
FIG. 11C shows a cutaway view of the example rotary union of FIGS. 11A and 11B.

FIG. 11C shows a cutaway view of the example rotary union 26 of FIGS. 11A and 11B.

Figure 12:
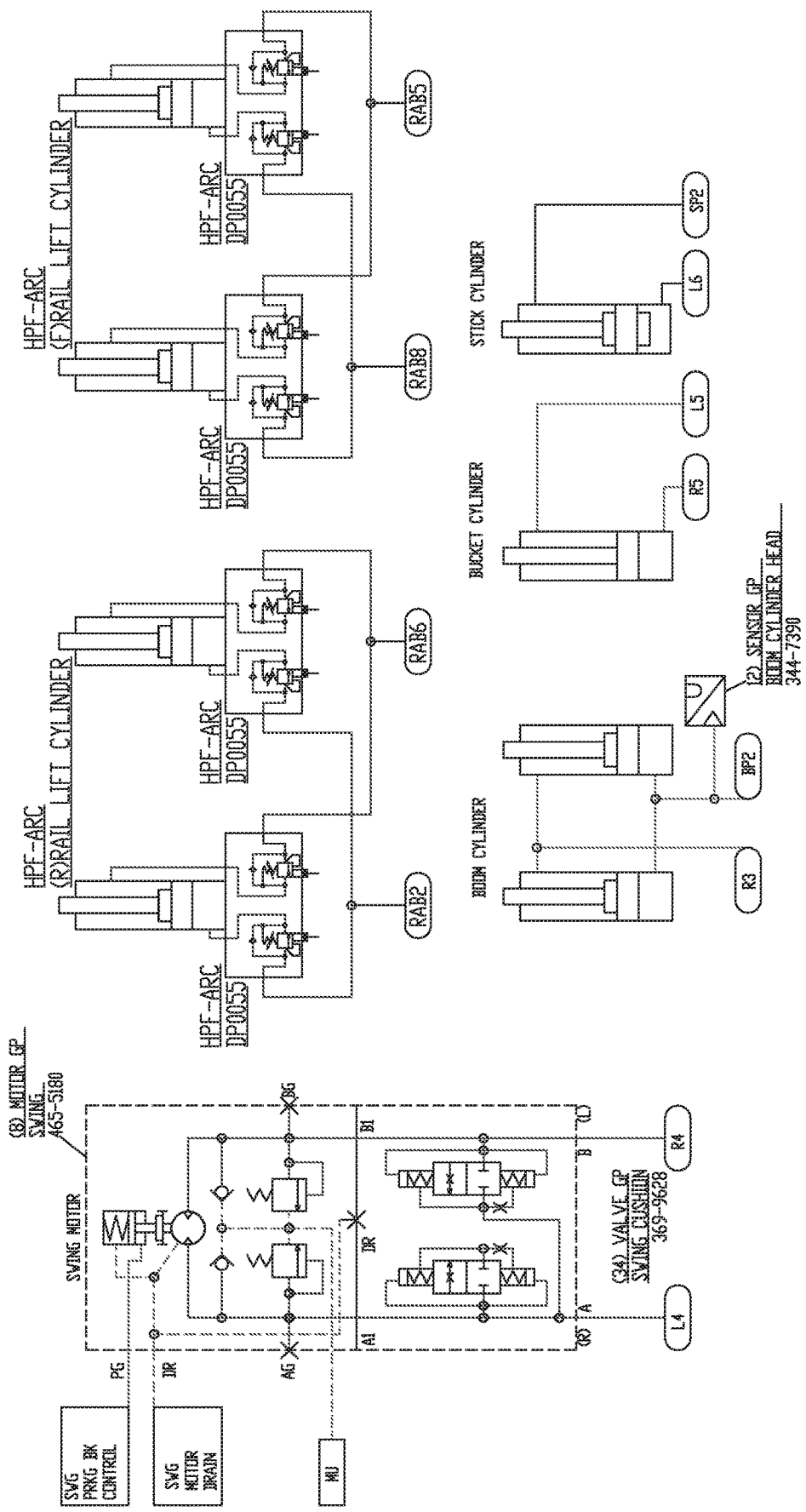
FIG. 12 shows a representative hydraulic diagram of various features for swing control for a mobile platform, including the swing motor controls, the rail lift cylinders, the boom cylinder, the bucket cylinder, and the stick cylinders, in accordance with aspects of the present disclosure.

FIG. 12 shows representative hydraulic diagrams of various features for swing control for a mobile platform, including the swing motor controls, the rail lift cylinders, a boom cylinder, a bucket cylinder, and a stick cylinder, for use in accordance with aspects of the present disclosure.

Figure 13:
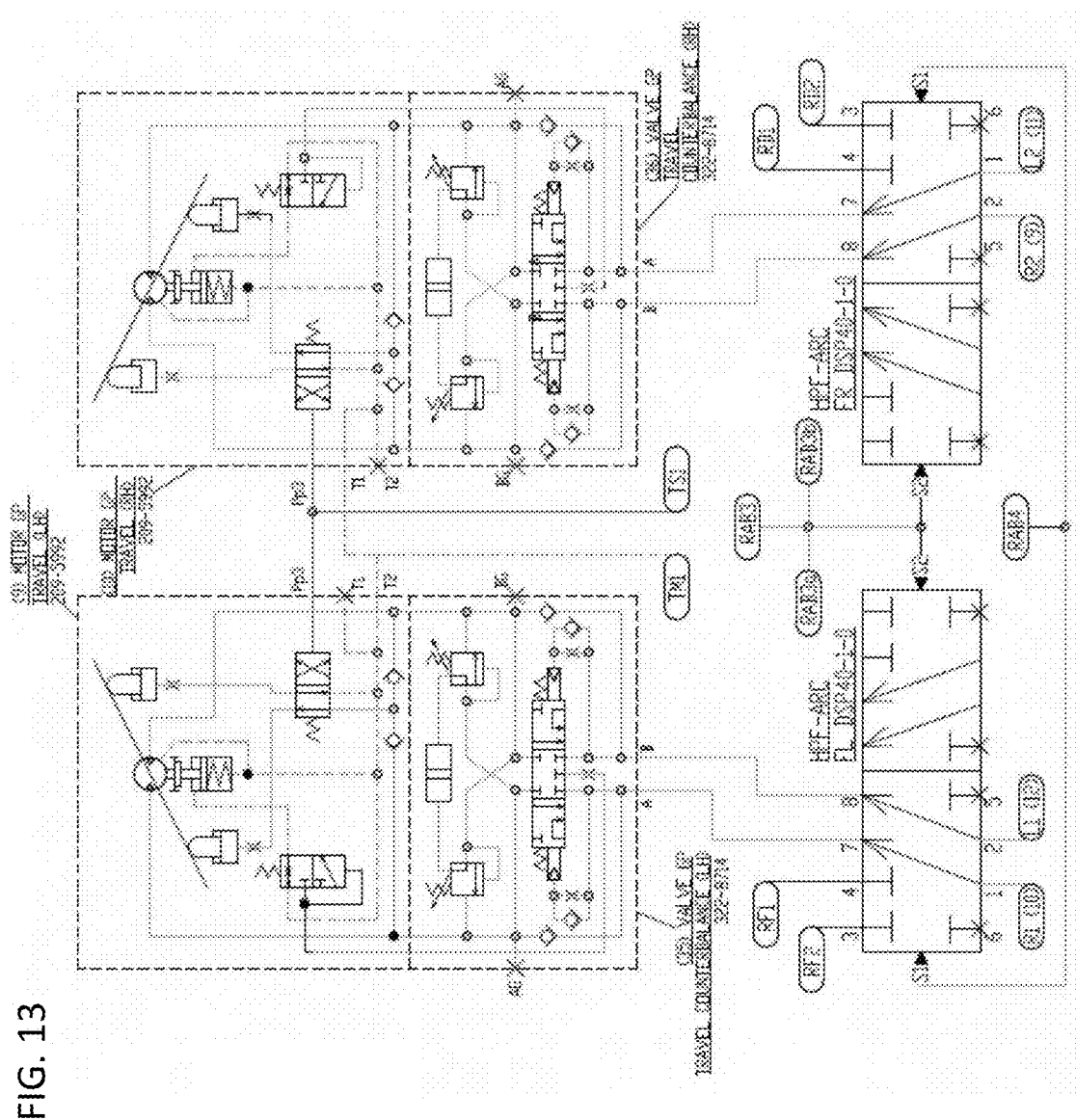
FIG. 13 shows a representative hydraulic diagram of example track motors for conveying a mobile platform, including diverter valves for use with operation of the track motors, in accordance with aspects of the present disclosure.

FIG. 13 shows a representative hydraulic diagram of example track motors and related features for conveying a mobile platform, including diverter valves for use with operation of the track motors, in accordance with aspects of the present disclosure.

Figure 14A:
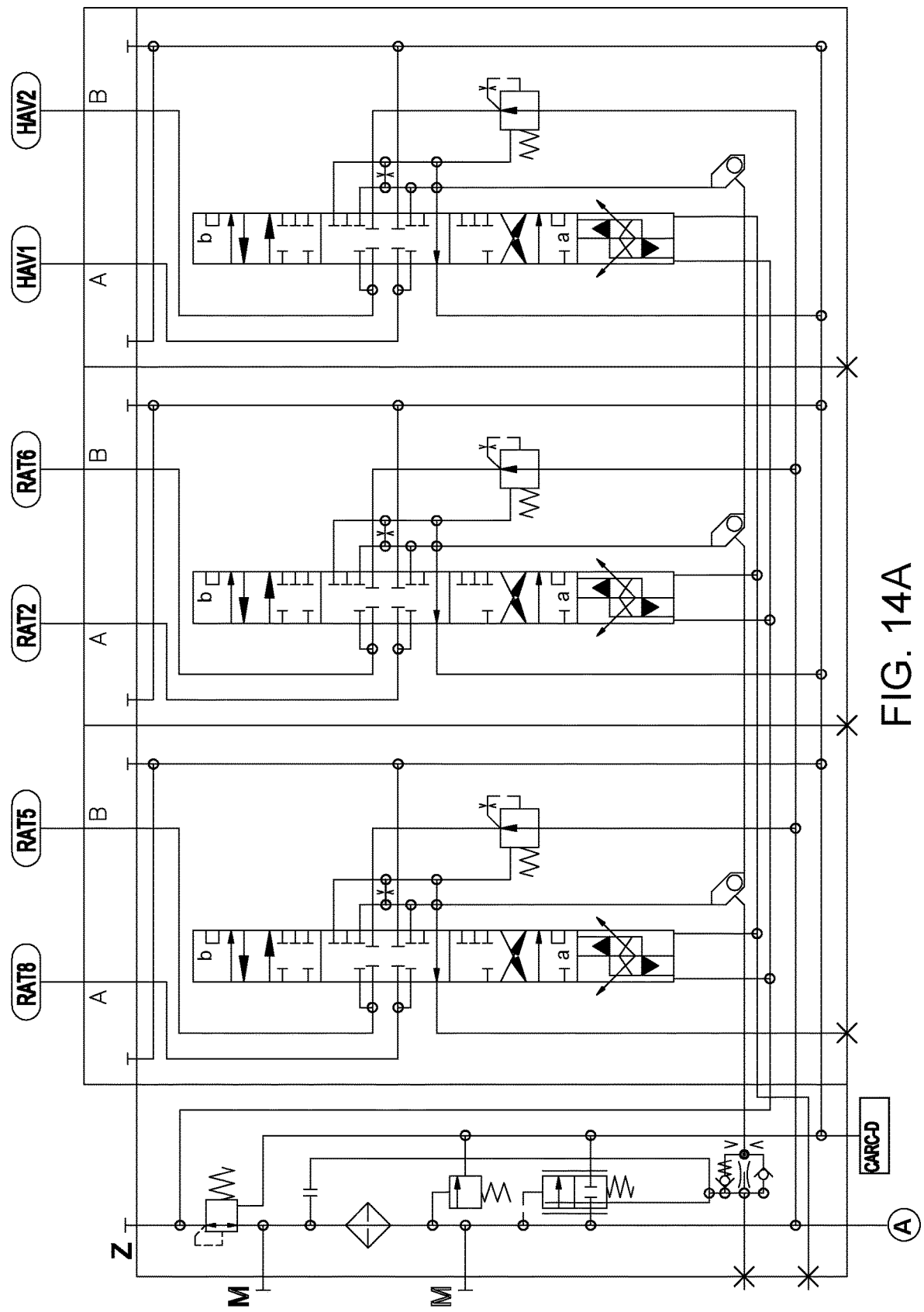
FIGS. 14A through 14C show a representative hydraulic diagram of an example Hawe valve, which includes a secondary main spool section relating to control of various features, including various track motor control features, for use in accordance with aspects of the present disclosure.
Figure 14B:
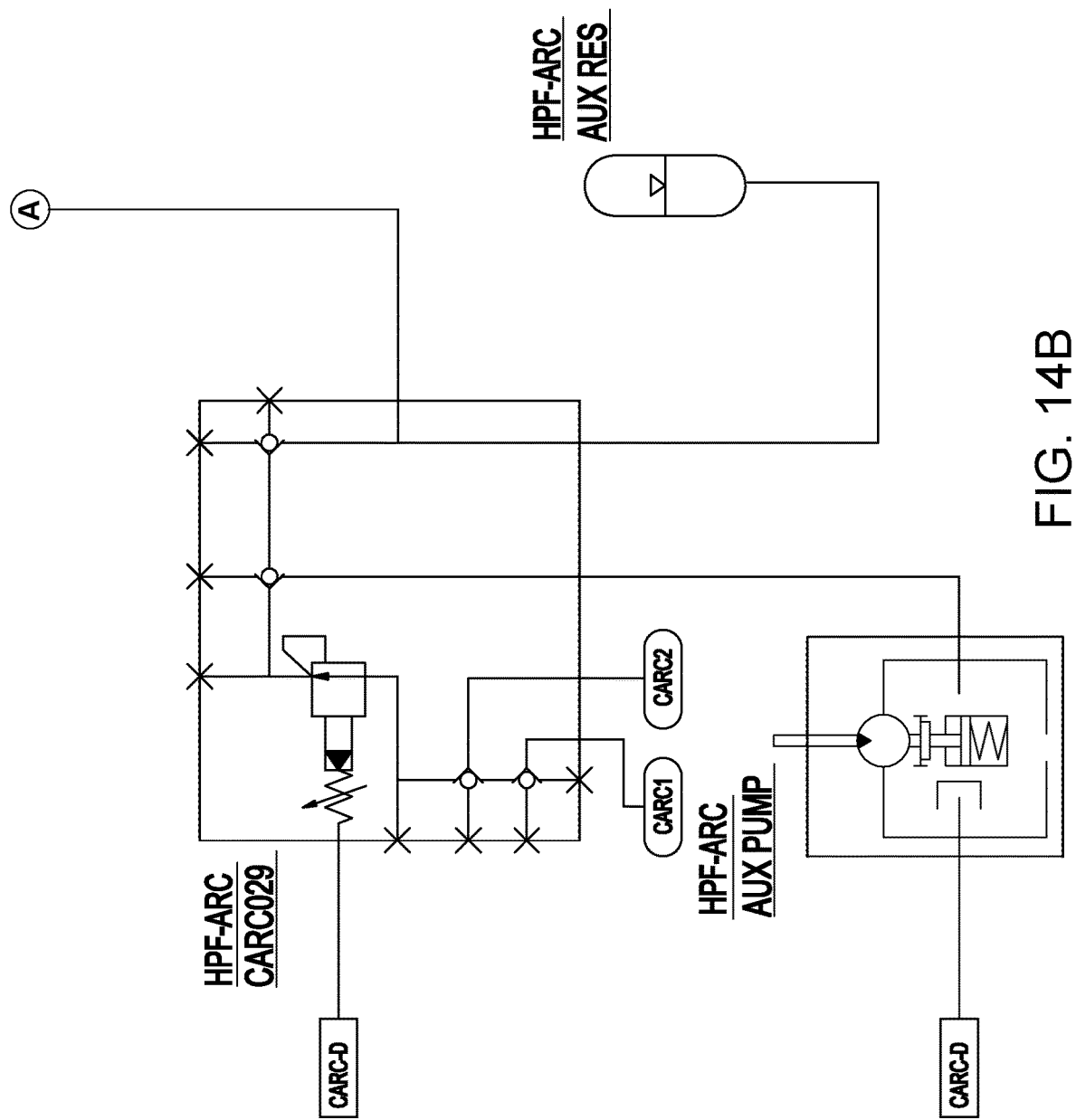
Figure 14C:
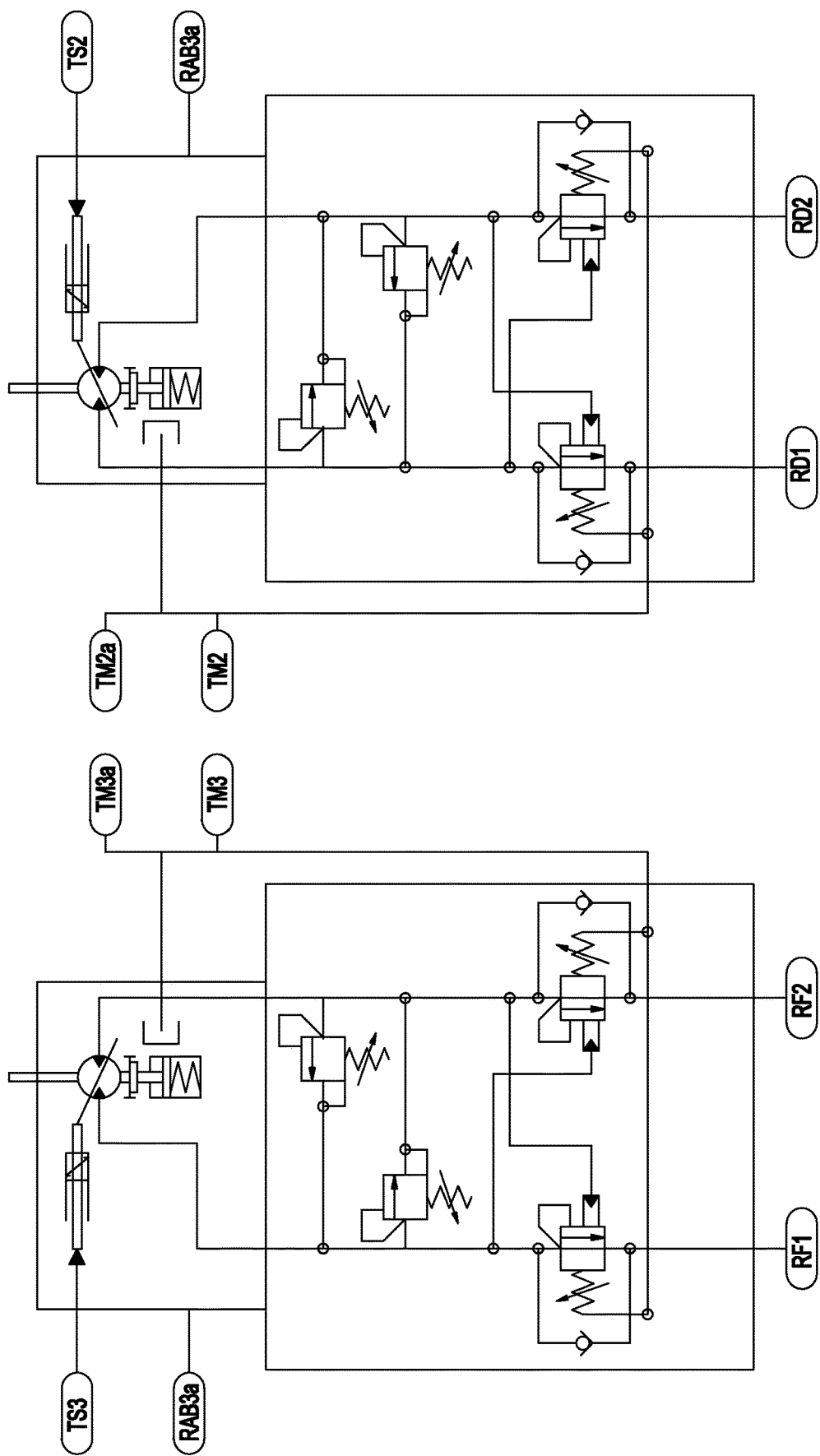

FIGS. 14A through 14C show a representative hydraulic diagram of an example Hawe valve, which includes a secondary main spool section relating to control of various features, including various track motor control features, for use in accordance with aspects of the present disclosure.

Figure 15A:
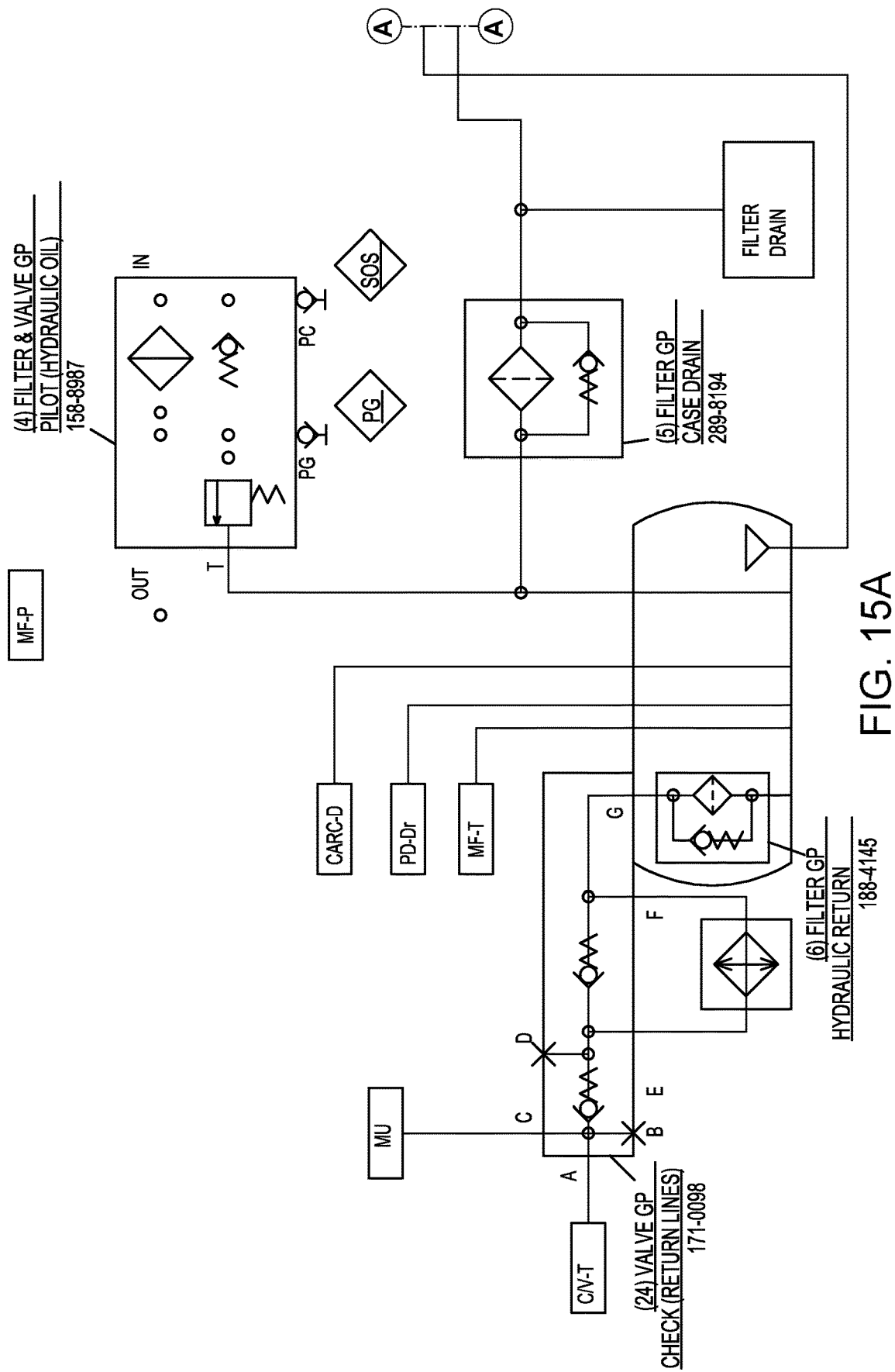
FIGS. 15A and 15B show a representative hydraulic diagram of an example main pump for a mobile platform, for use in accordance with aspects of the present disclosure.
Figure 15B:
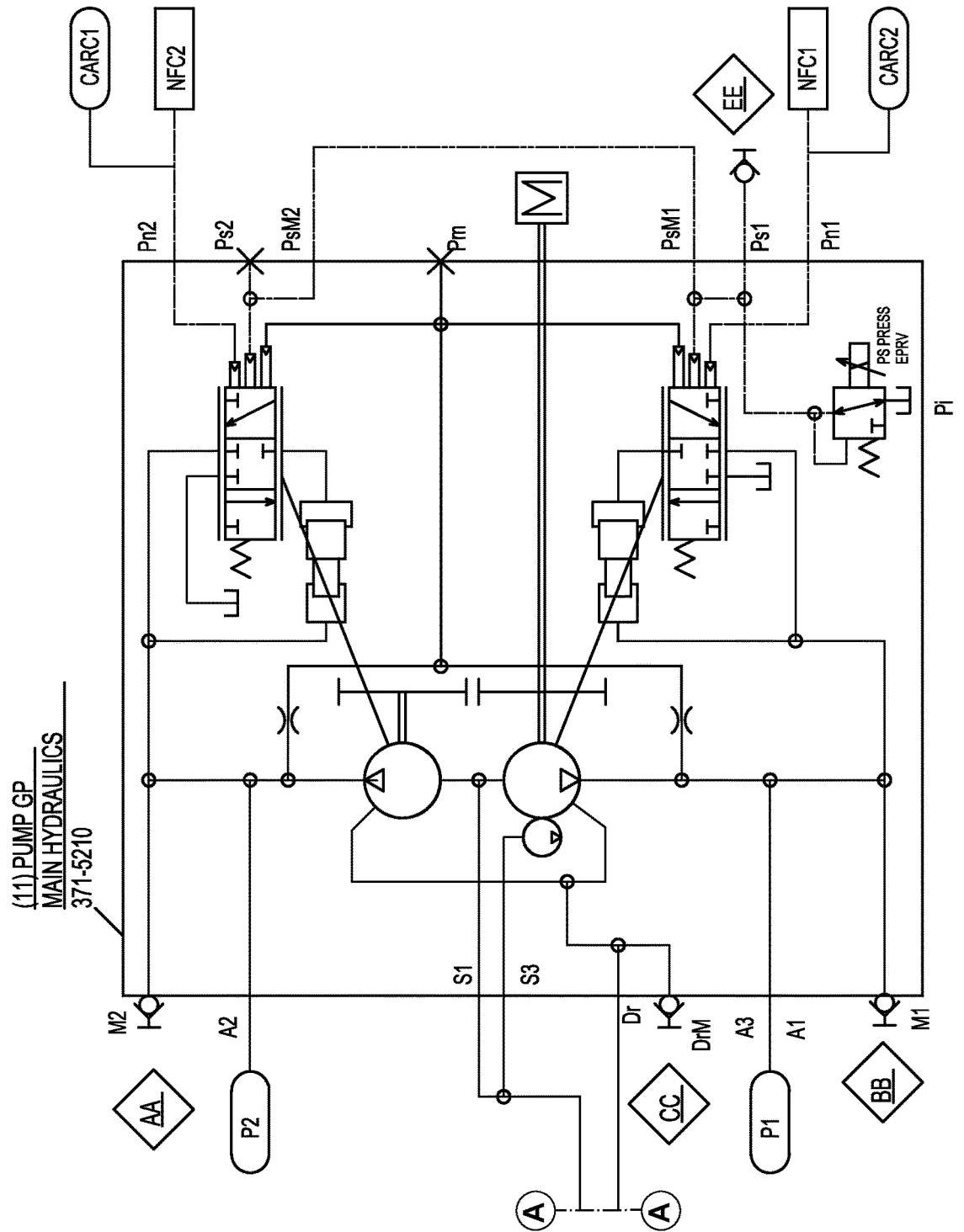
Figure 16A:
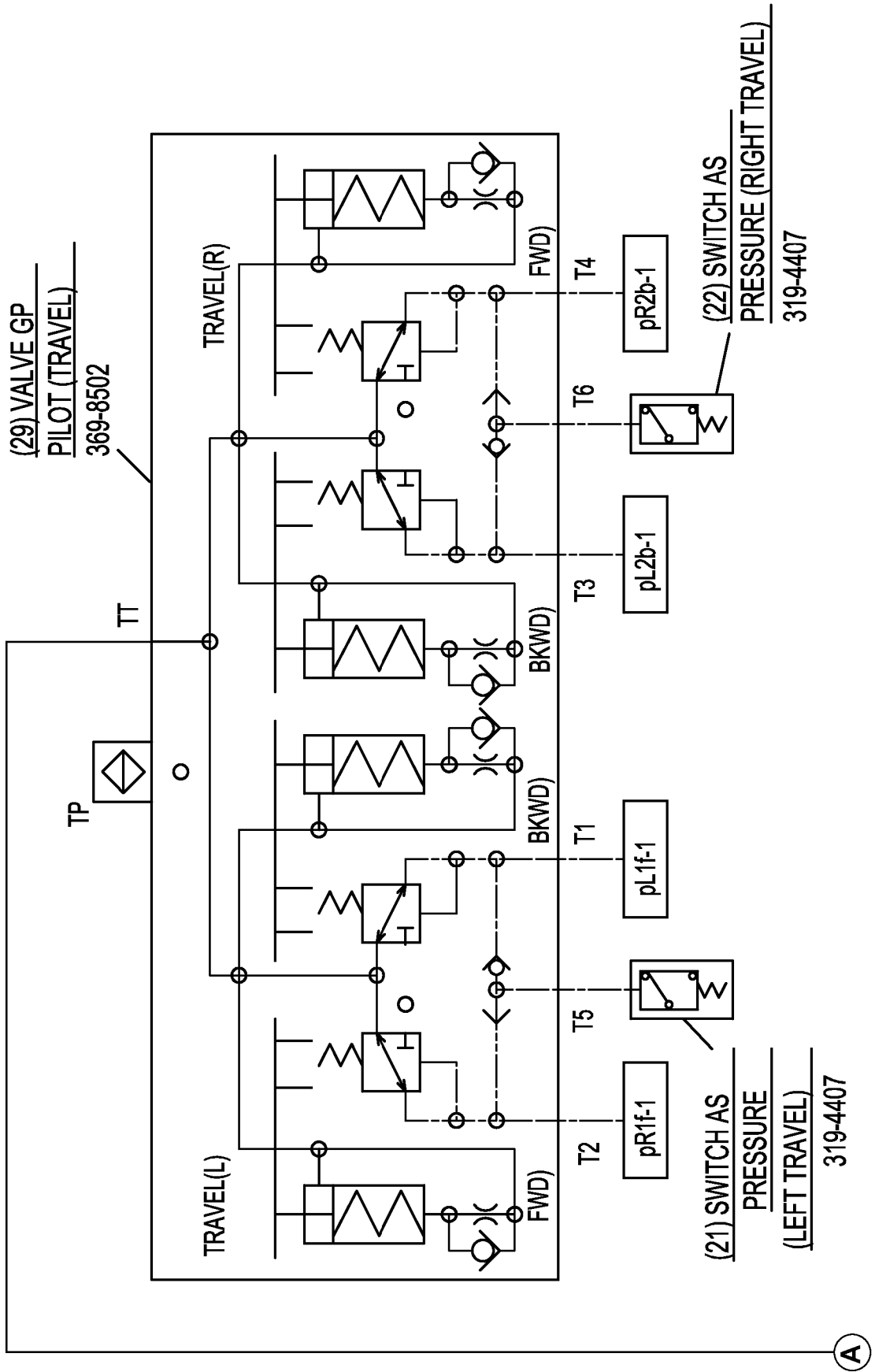
FIGS. 16A through 16F show a representative hydraulic diagram of an example travel control section, including control handles, for a mobile platform, for use in accordance with aspects of the present disclosure.
Figure 16B:
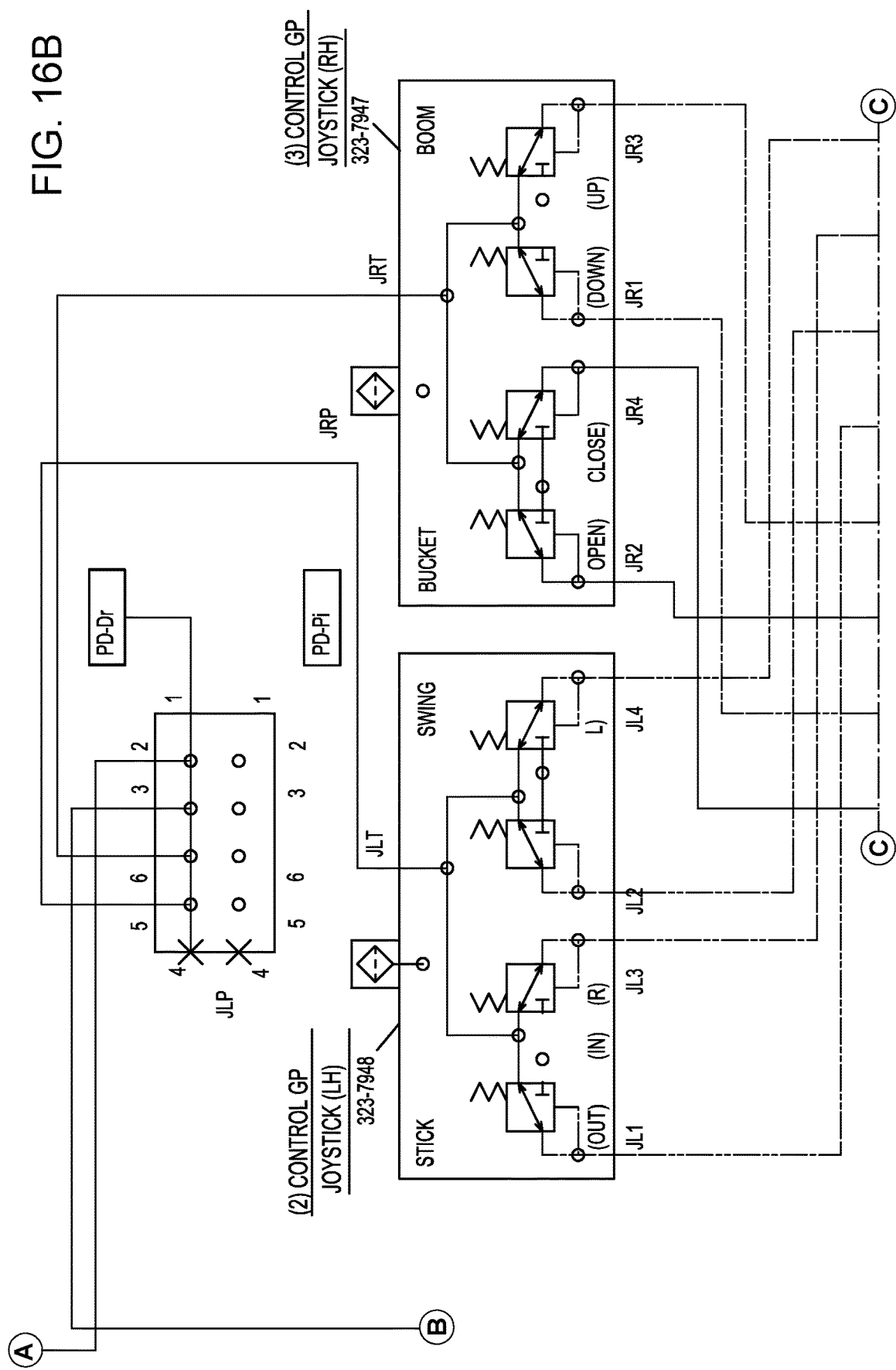
Figure 16C:
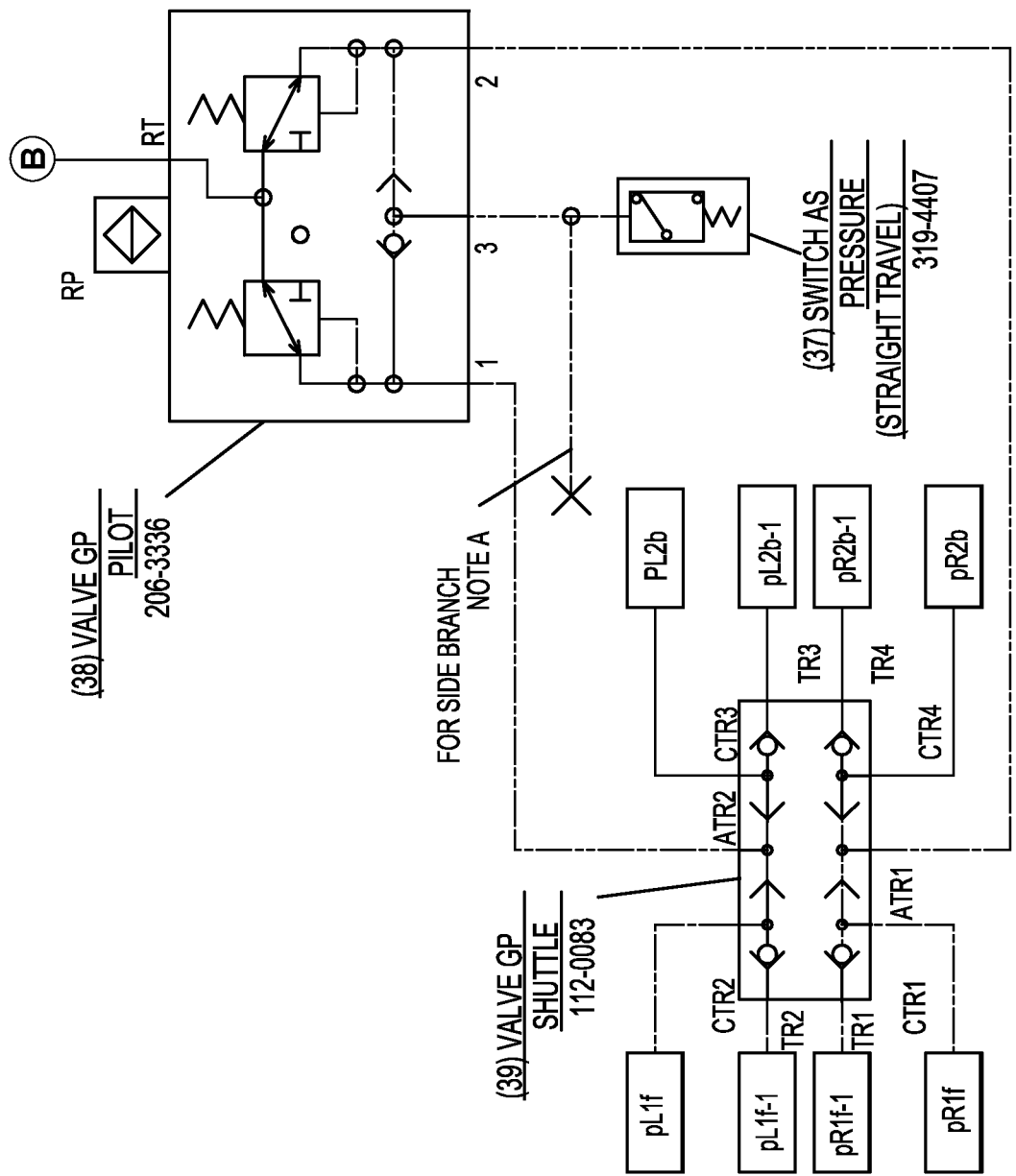
Figure 16D:
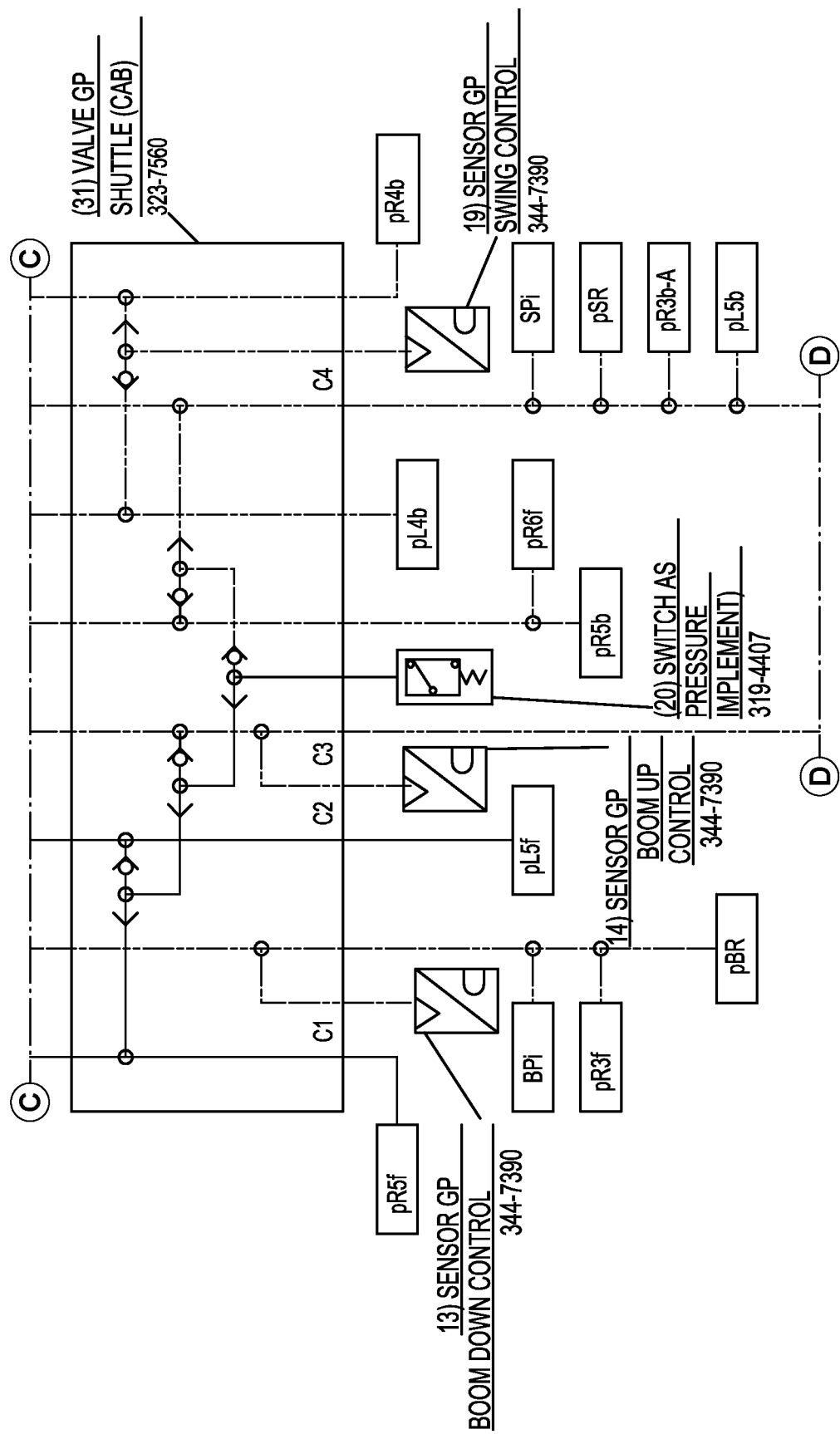
Figure 16E:
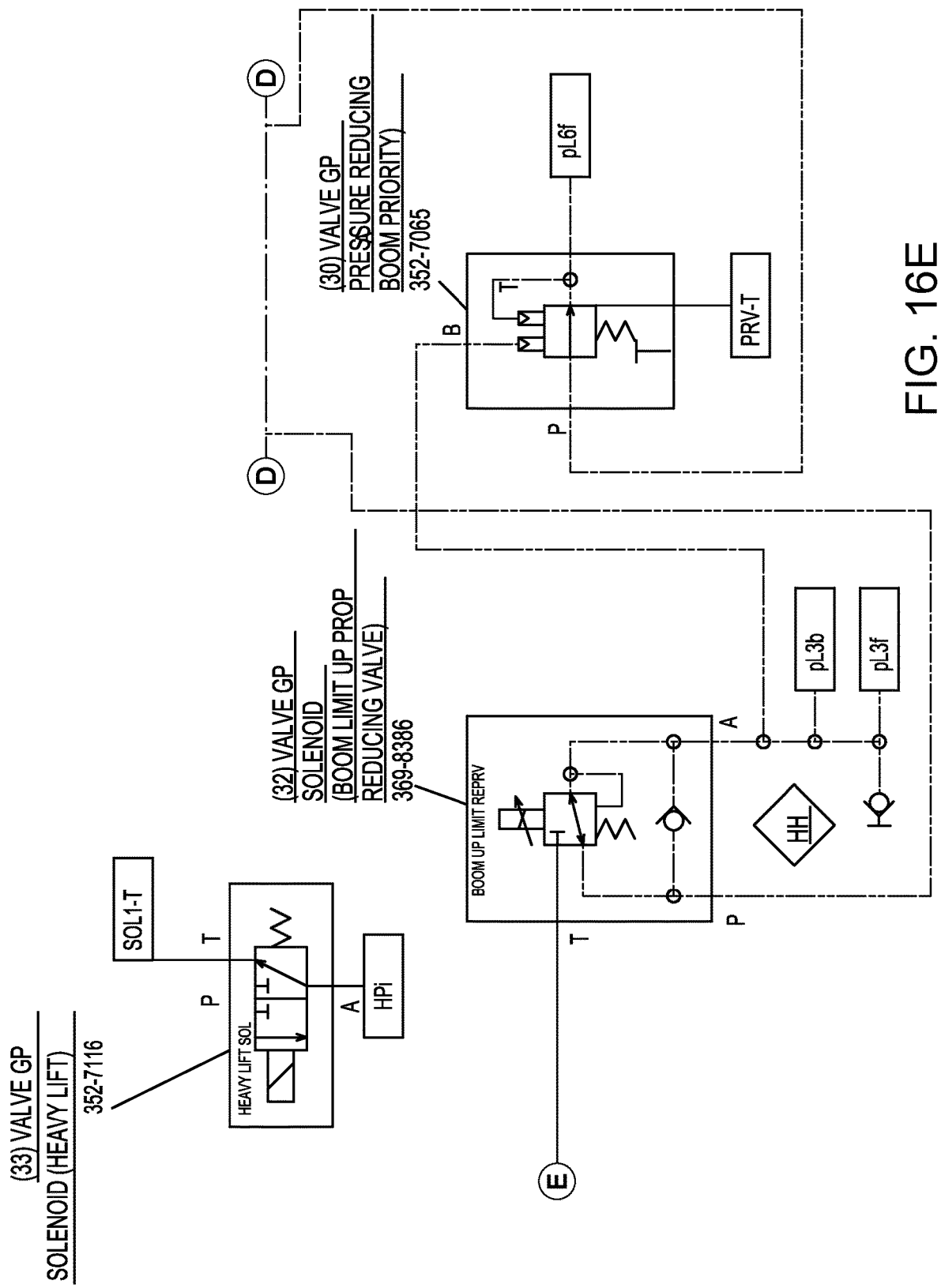
Figure 16F:
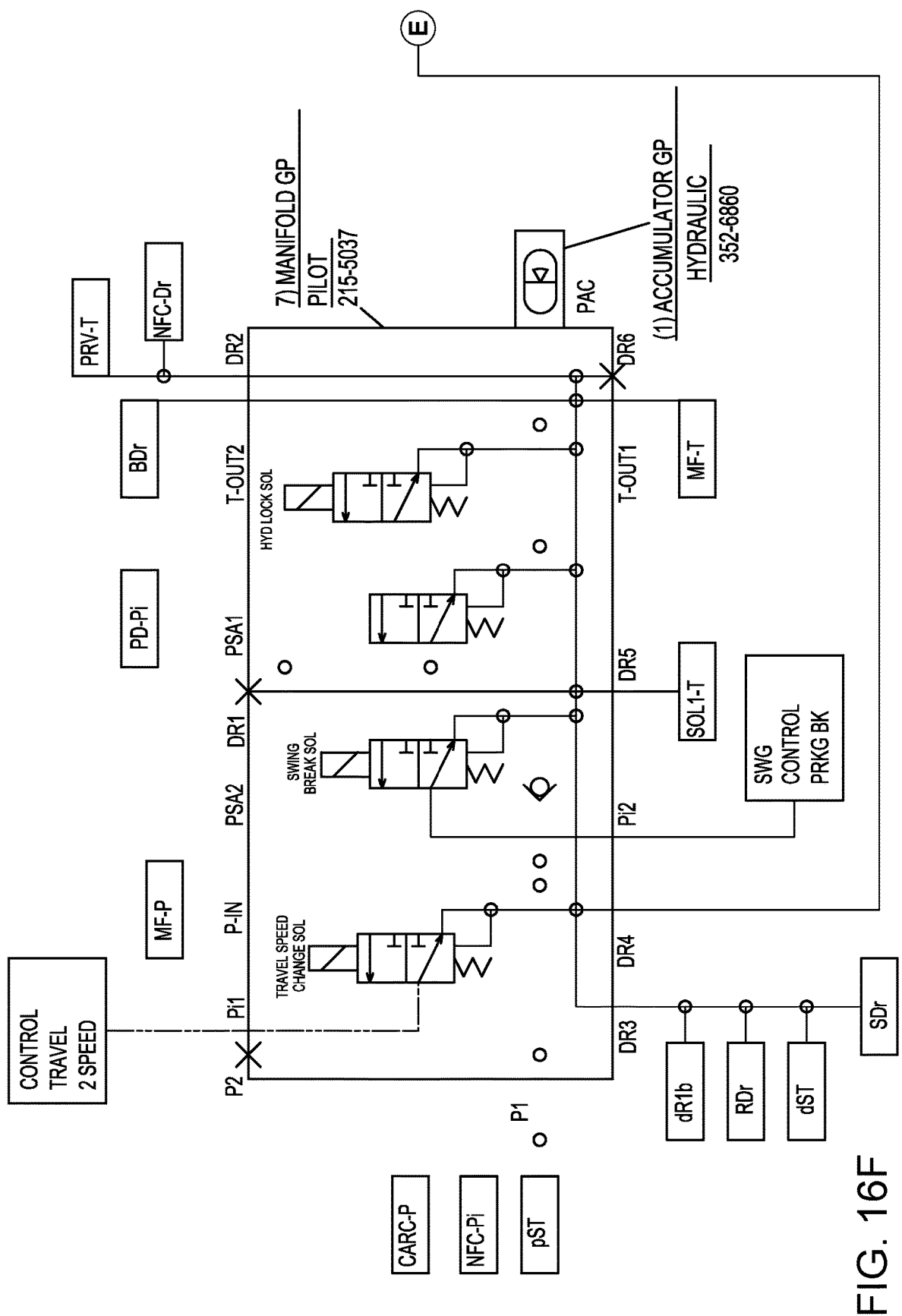

FIGS. 15A and 15B show a representative hydraulic diagram of an example main pump for a mobile platform, for use in accordance with aspects of the present disclosure.

FIGS. 16A through 16F show a representative hydraulic diagram of an example travel control section, including control handles, for a mobile platform, for use in accordance with aspects of the present disclosure.

Figure 17A:
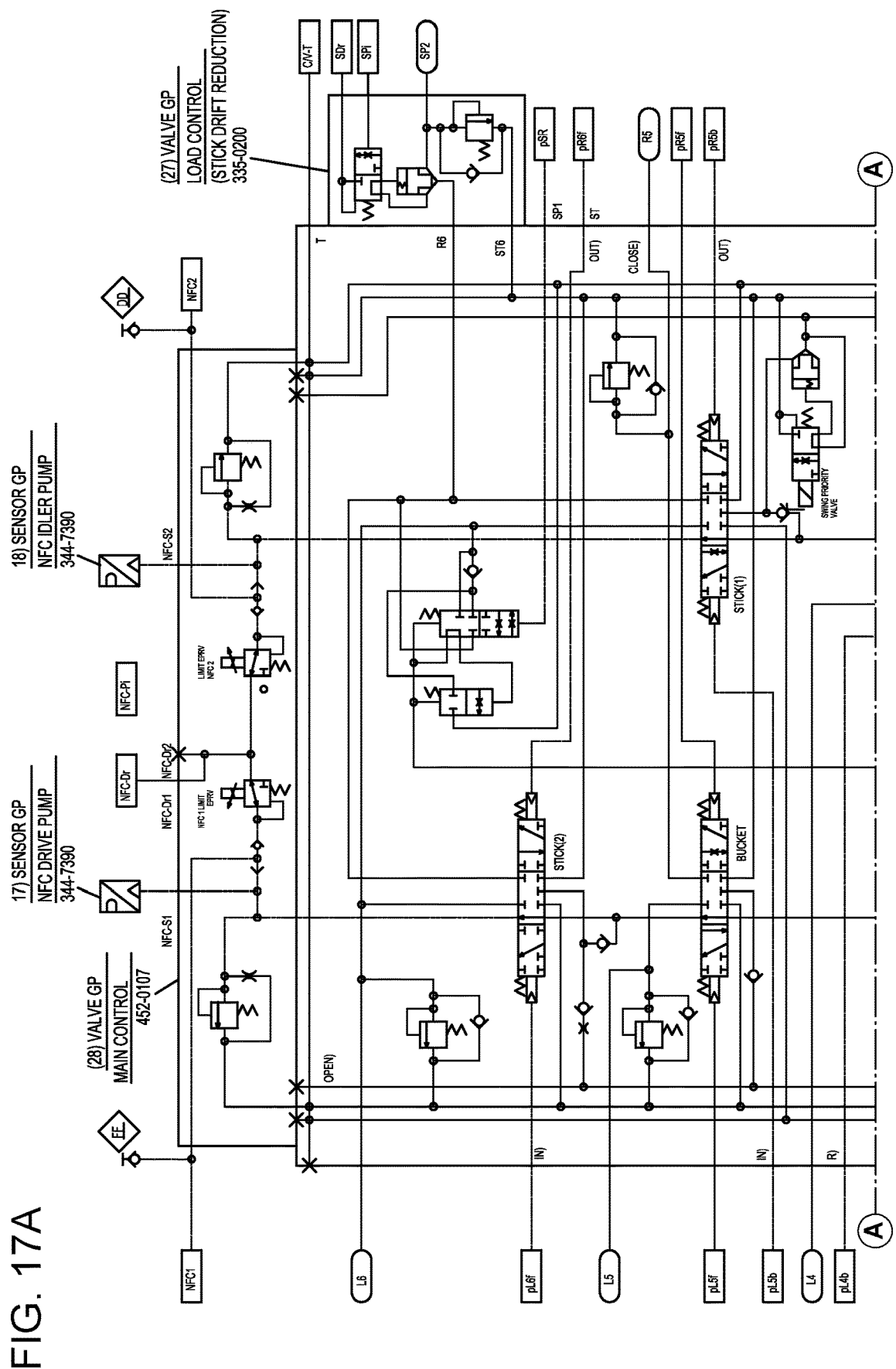
FIGS. 17A and 17B show a representative hydraulic diagram of an example main spool bank for a mobile platform, for use in accordance with aspects of the present disclosure.
Figure 17B:
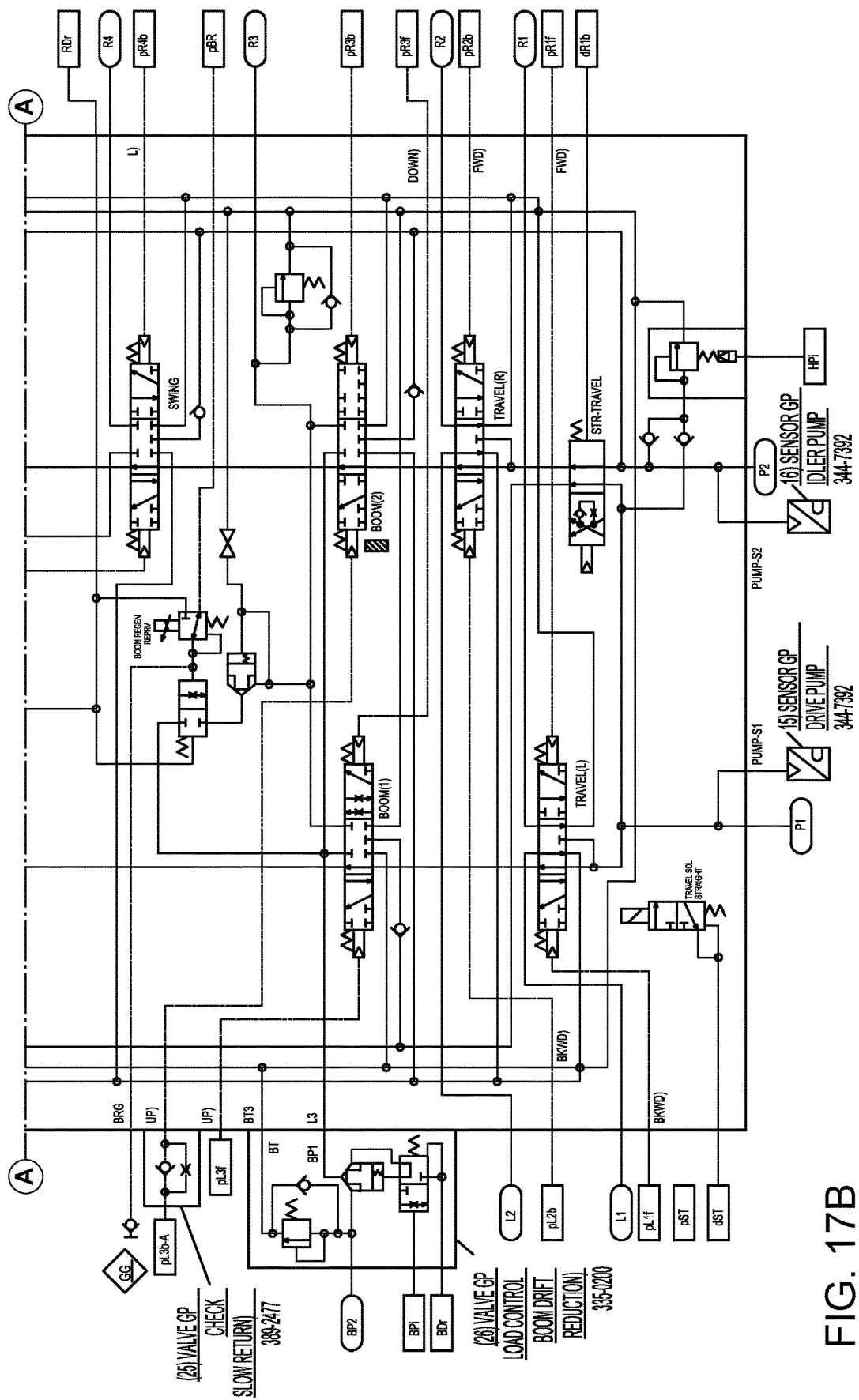

FIGS. 17A and 17B show a representative hydraulic diagram of an example main spool bank for a mobile platform, for use in accordance with aspects of the present disclosure.

FIG. 18 shows a representative hydraulic diagram of an example brake pressure reducing valve (PRV), which may control an external braking system, in accordance with aspects of the present disclosure, and FIG. 20 shows the corresponding example brake cylinders for use therewith.

FIG. 19 shows a representative hydraulic diagram of a shift block, which may control shift between rails and track, in accordance with aspects of the present disclosure.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A motor drive assembly for rail operation of a mobile platform having an underbody and a source of hydraulic pressure, the motor drive assembly comprising:
   a first drive arm assembly mounted proximal to a first end of a mobile platform underbody, wherein the drive arm assembly includes:
      a wheel;
      a motor operatively coupled to the wheel;
      a gearbox operatively coupled to the motor; and
      a counterbalance valve assembly hydraulically coupled to the gearbox, the counterbalance valve assembly including a cross-port relief valve, the counterbalance valve assembly having a selectively completed first hydraulic operating circuit and second hydraulic operating circuit;
   wherein the completed first hydraulic operating circuit communicates the hydraulic pressure from the source to enable movement of the mobile platform via the gearbox to the motor and the wheel; and
   wherein the second hydraulic operating circuit communicates the hydraulic pressure via the cross-port relief valve to prevent communication of the hydraulic pressure from the gearbox via action of the wheel and the motor past the counterbalance valve assembly.

2. The hydraulic motor drive assembly of claim 1, further comprising:
   a second drive arm assembly mounted proximal to a second end of the mobile platform underbody.

3. The hydraulic motor drive assembly of claim 1, further comprising:
   a diverter hydraulically coupled to the counterbalance valve assembly.

4. The hydraulic motor drive assembly of claim 3, wherein the diverter is selectively actuable to engage the first drive arm assembly.

5. The hydraulic motor drive assembly of claim 1, wherein the mobile platform includes a main spool bank, and wherein the hydraulic motor drive assembly is hydraulically coupled to the main spool via the diverter.

6. The hydraulic motor drive assembly of claim 5, wherein the mobile platform includes a rotary union, and wherein the hydraulic motor assembly is hydraulically coupled to the spool bank via the rotary union.

7. The hydraulic motor drive of claim 4, wherein the mobile platform includes a track drive.

8. The hydraulic motor drive assembly of claim 7, wherein the diverter is selectively actuable to engage the track drive.

9. The hydraulic motor drive assembly of claim 1, wherein the first drive arm assembly is pivotably moveable so as to engage a rail.

10. The hydraulic motor drive assembly of claim 8, further comprising:
    a switch for selectively enabling operation of the drive arm assembly or the track drive.

11. The hydraulic motor drive assembly of claim 10, wherein the switch is electrically or electro-mechanically operated.

12. The hydraulic motor drive assembly of claim 1, wherein the counterbalance valve assembly is located within the underbody.

13. The hydraulic motor drive assembly of claim 1, wherein the counterbalance valve assembly is located proximal to the underbody.

14. The hydraulic motor drive assembly of claim 3, wherein the diverter is located within the underbody.

15. The hydraulic motor drive assembly of claim 3, wherein the diverter is located proximal to the underbody.

16. The hydraulic motor drive assembly of claim 1, wherein the gearbox includes a gearbox flange operably engageable with the wheel.

17. The hydraulic motor drive assembly of claim 1, further comprising:
    a second wheel;
    a second gearbox;
    a first coupler element located between the gearbox and the wheel; and
    a second coupler element located between the second gearbox and the second wheel;
    wherein the first coupler element and the second coupler element operate cooperatively to rotationally align motion of the wheel and the second wheel.

* * * * *